(12) United States Patent
Westra et al.

(10) Patent No.: US 11,754,698 B2
(45) Date of Patent: Sep. 12, 2023

(54) RADAR BASED SYSTEM FOR PROCESSING RADAR DATA REPRESENTING RANGE AND RADIAL VELOCITY OF A DETECTED OBJECT

(71) Applicant: ROBIN RADAR FACILITIES BV, The Hague (NL)

(72) Inventors: Hylke Jurjen Lijsbert Westra, Leiden (NL); Siete Hamminga, Heemstede (NL); Bart Portegijs, Leiden (NL)

(73) Assignee: ROBIN RADAR FACILITIES BV, The Hague (NL)

( * ) Notice: Subject to any disclaimer, the term of this patent is extended or adjusted under 35 U.S.C. 154(b) by 38 days.

(21) Appl. No.: 17/548,645

(22) Filed: Dec. 13, 2021

(65) Prior Publication Data

US 2022/0252716 A1    Aug. 11, 2022

(30) Foreign Application Priority Data

Dec. 22, 2020  (DK) .............................. PA202070868

(51) Int. Cl.
*G01S 13/42* (2006.01)
*G01S 13/89* (2006.01)
*G01S 13/58* (2006.01)

(52) U.S. Cl.
CPC .......... *G01S 13/426* (2013.01); *G01S 13/584* (2013.01); *G01S 13/89* (2013.01)

(58) Field of Classification Search
CPC ....... G01S 13/426; G01S 13/584; G01S 13/89
See application file for complete search history.

(56) References Cited

U.S. PATENT DOCUMENTS

2020/0326418 A1\* 10/2020 Keijer .................... G01S 13/72
2020/0341114 A1\* 10/2020 Acharya ............... G01S 13/723

\* cited by examiner

*Primary Examiner* — Matthew M Barker
(74) *Attorney, Agent, or Firm* — Nordic Patent Service

(57) ABSTRACT

A Doppler type radar system holds processing circuitry configured to generate a data array based on received radar data to thereby provide an optimized input of radar data for further processing, such as processing by a neural network or convolutional neural network.

24 Claims, 11 Drawing Sheets

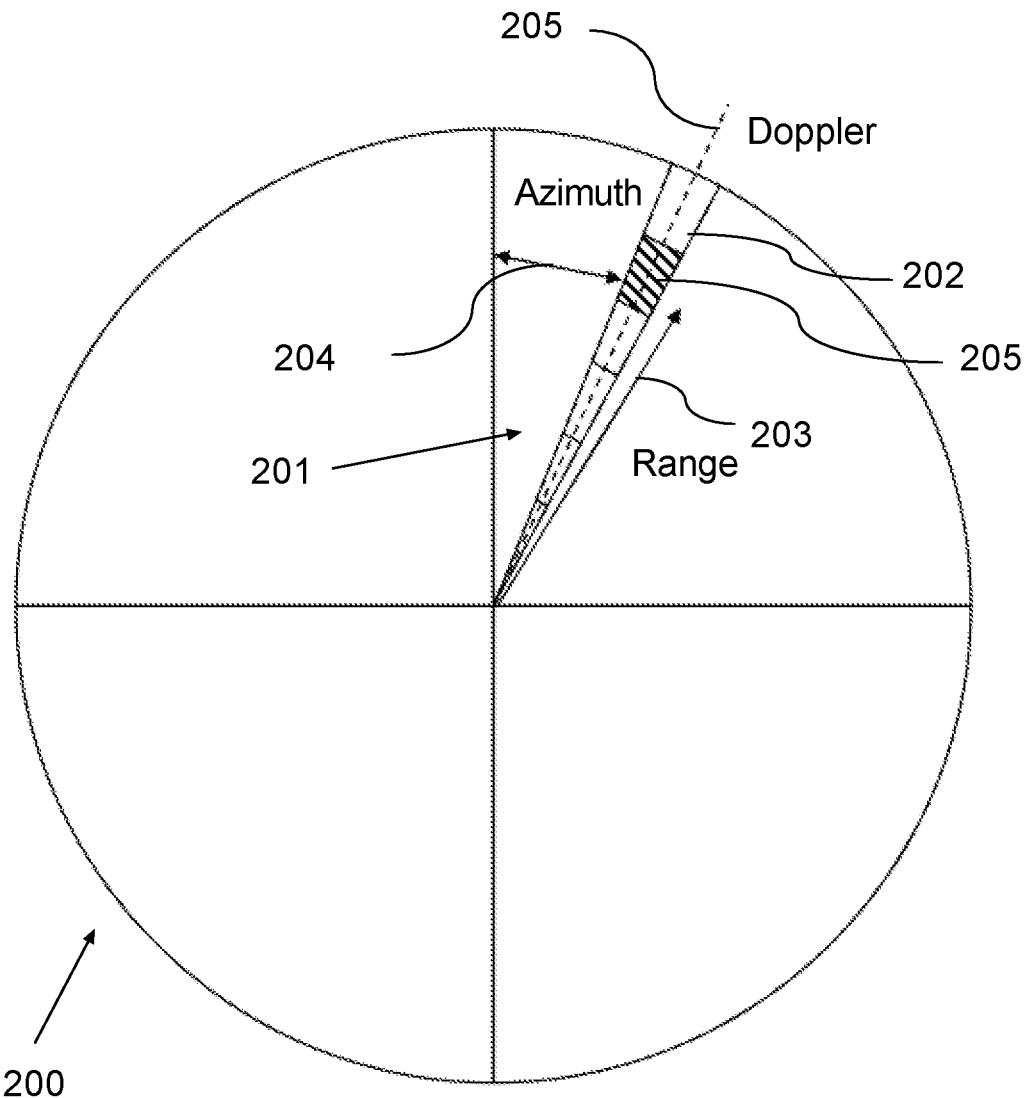
Fig. 2a
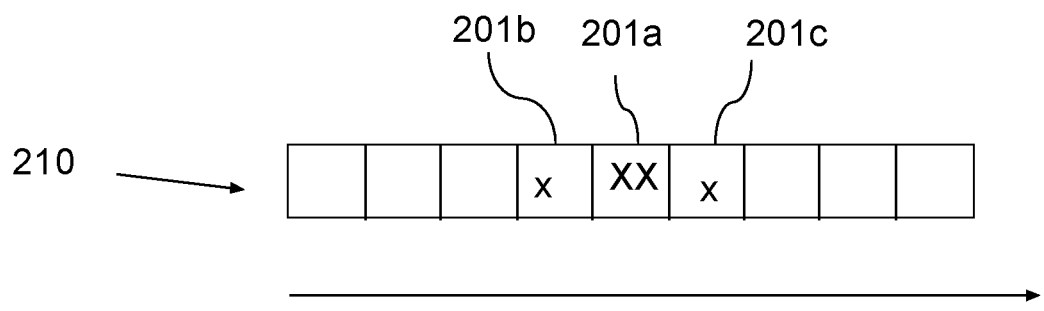
Fig. 2b    Image lines-beam lines 2D radar

Single image line of 3D radar image

Image lines-beam lines 3D radar

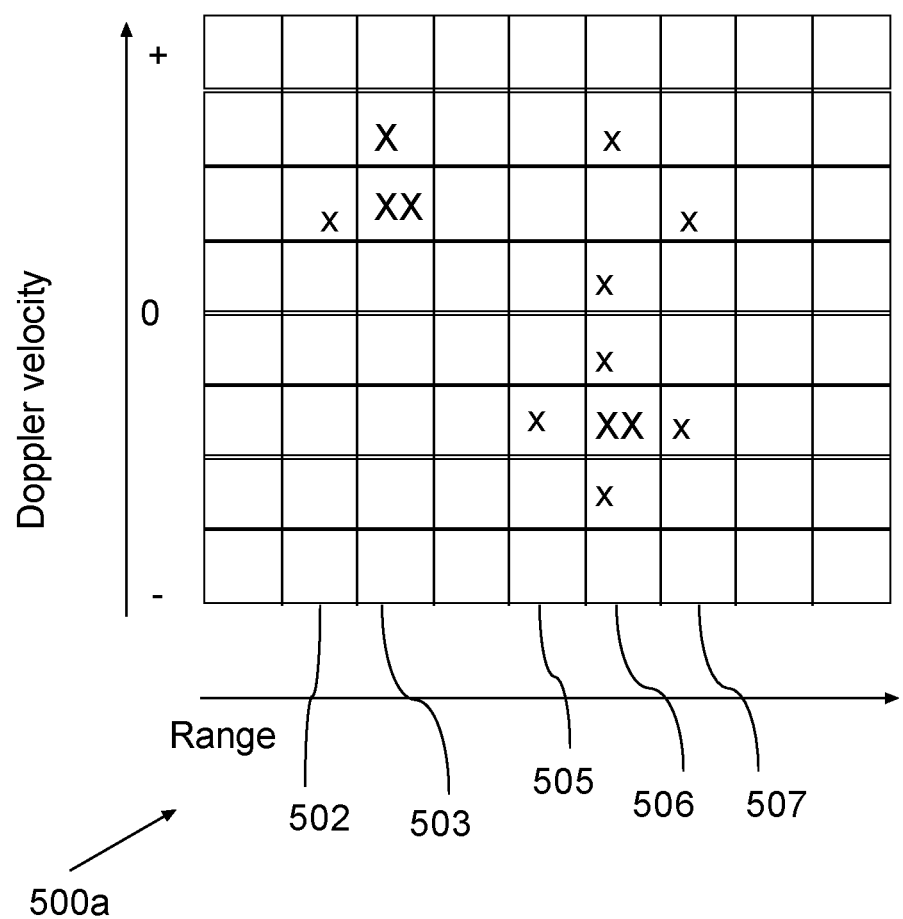
Fig. 5a  un-cropped range-Doppler matrix

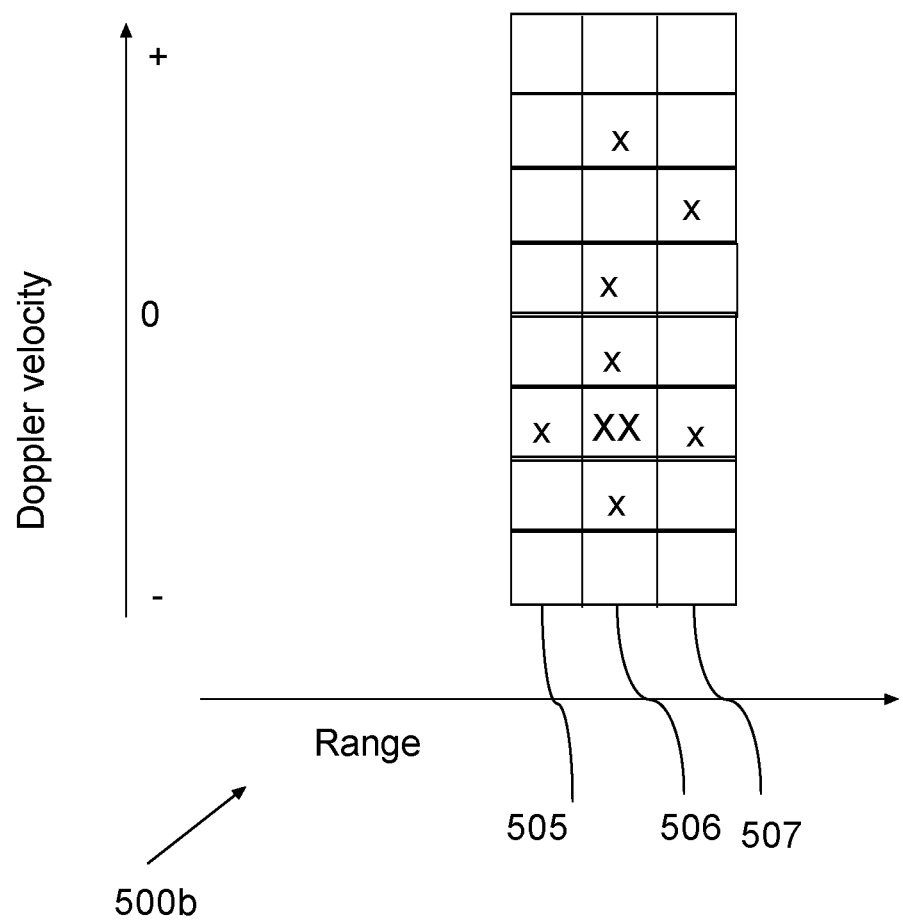
Fig. 5b  cropped range-Doppler matrix

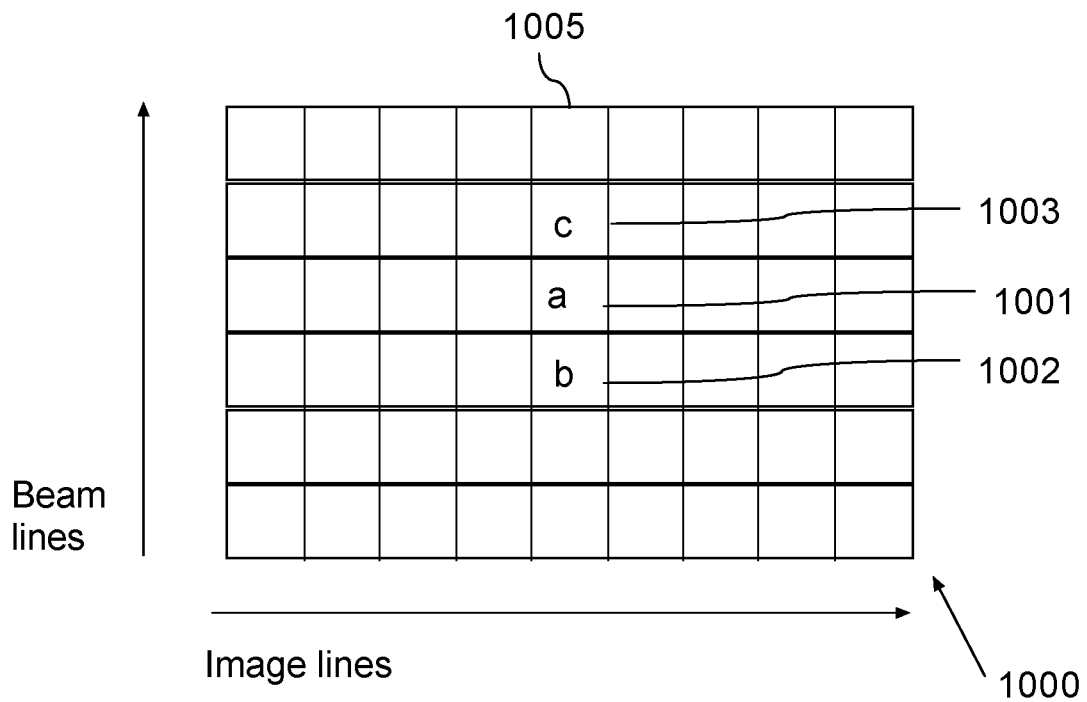
Fig. 10  Image lines-beam lines 3D radar
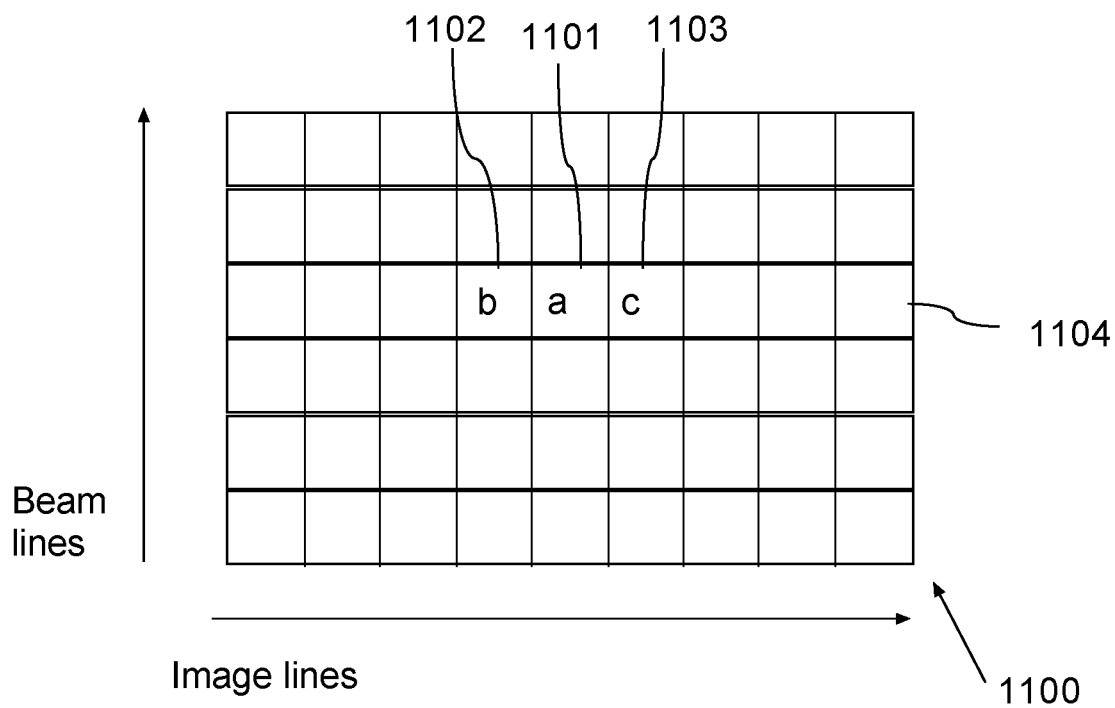
Fig. 11  Image lines-beam lines 3D radar Image lines-beam lines 3D radar Image lines-beam lines 3D radar

RADAR BASED SYSTEM FOR PROCESSING RADAR DATA REPRESENTING RANGE AND RADIAL VELOCITY OF A DETECTED OBJECT

TECHNICAL FIELD

The disclosure relates to a radar system using a Doppler type radar system, such as a Frequency Modulated Continuous Wave, FMCW, radar system for scanning and detection of objects, and more particularly to generation of a three-dimensional data array holding information based on range and radial velocity of a detected object. The generated data array can be used for classification of detected objects, including objects such as Unmanned Aerial Vehicles, UAVs.

BACKGROUND

In recent years the number of small Unmanned Aerial Vehicles, UAVs, available to civilian users has largely increased. These platforms may be privately used for leisure and filming, but also for applications such as agriculture and environmental monitoring, surveillance, and disaster response. However, small UAVs can also be misused to perform anti-social, unsafe, and even criminal actions, such as privacy violation, collision hazard (with people, other UAVs, and larger aircraft), and even transport of illicit materials. As a result, there is an increasing interest in developing sensor systems that can detect and track UAVs. Detection and tracking of AUVs with radar pose significant challenges, as small UAVs typically have a low radar cross section and fly at lower speed and altitude in comparison with conventional aircrafts. Small UAVs are also capable of highly varied motion, which complicates the task of separating them from clutter stationary background. Also, the high maneuverability of small UAVs makes the tracking problem more difficult, as it is not possible to make strong assumptions about the expected UAV motion.

Doppler type radar systems, such as FMCW radar systems, are well-known and wide spread for use in the automotive sector and other industrial applications, where the FMCW radar system provides range and Doppler information of a detected object or target, where the Doppler frequency shift may be transformed into the radial velocity of the detected object or target.

During the operation of an FMCW radar, the system transmits a continuous radio energy with a frequency modulated by a triangular or sawtooth-shaped signal. As a result, the frequency of the transmitted signal varies gradually with time. When the signal is reflected by an object, the received waveform will build up a delayed replica of the transmitted waveform, with the time delay as a measure of the target range. If the target is moving, the radar system will register a Doppler shift within the received signal. Compared to the frequency of the emitted signal, the received signal will show a higher frequency when the target is approaching and a lower frequency when the target is moving away from the radar location. Thus, the total Doppler shift may result from the superposition of both source and observer motions. Specifically, the amount of Doppler shift is directly proportional to the radial speed of the target.

In range-Doppler processing, range and velocity information of moving objects is retrieved by applying a double Fourier transform to the received signal. The first transform (range FFT) is applied to the received signal from a transmitted upsweep in order to produce a high resolution range line. The range FFT is repeated for a chosen integration time to obtain an appropriate number of range lines, and the second Fourier transform (Doppler FFT) is now applied across the obtained number of range lines. The result is a so-called range-Doppler map, or range-radial velocity map, where one axis represents range and the other axis represents radial velocity. The range-Doppler map is a matrix of range-velocity cells holding return signal values of targets being hit, where the amplitude value of a range-velocity cell represents the return energy of the transmitted radar wave signal being transmitted from a target having the range and radial velocity indicated by the position of the range-velocity cell.

The range-Doppler map or matrix may be arranged with a number individual target ranges along the x-axis and a number of individual velocity ranges along the y-axis, whereby a column of the matrix represents the velocity detection span for a given individual target range, and a row represents the range detection span for a given individual target velocity range. For a given individual target range, several different target velocities with different return signal values may be observed, where the observed radial velocities and return signal values are represented by the data of the velocity column corresponding to the individual target range. The velocity column may be referred to as a so-called Doppler signature, and the range-Doppler map/matrix then consists of the Doppler signatures of all the individual target ranges. For a given target range, the data of the corresponding Doppler signature varies with time, and when successive Doppler signatures are obtained for the same target range, such as by generating a number of successive range-Doppler maps/matrixes, these Doppler signatures may be concatenated into a so-called Doppler spectrogram, showing the Doppler frequencies or radial velocities as a function of time for the individual target range being observed.

High range resolution Doppler type radar systems are now also being used for detecting and characterizing small UAVs by using micro-Doppler analysis of obtained range-Doppler data. The relative motion of parts is characteristic for different classes of targets, e.g. the flapping motion of a bird's wing vs. the spinning of propeller blades. In a range-Doppler map or range-radial velocity map, the moving parts of a body causes a characteristic Doppler signature, where the main contribution comes from the torso of the body, which causes the Doppler frequency of the target, while the flapping motion of bird wings or propeller blades induces modulation on the returned radar signal and generates sidebands around the central Doppler frequency of a Doppler signature, which may be referred to as micro-Doppler signatures. The width of the sidebands of a micro-Doppler signature within a range-Doppler map/matrix may therefore be indicative of the type of target being hit by the transmitted radar waves. When using radial velocity for a range-Doppler map, the width of the sidebands of a micro-Doppler signature will then be given by the width of the radial velocity span of the micro-Doppler signature.

In order to generate a track for a target, a number of matching plots have to be generated, where a plot holds range, azimuth, amplitude and radial velocity information of a validated target. Furthermore, the radar system may have to scan for objects within a full circular range of 360° at a high repetition frequency, which requires a high number of rather complicated signal-processing steps, especially for generation of the radial velocity information, to be performed within a limited time and with limited processing power.

Today's Doppler type radar systems incorporates signal processors, which perform clutter filtering of the returned radar wave signals, calculate range-Doppler maps to obtain range, amplitude and radial velocity information of a validated target, which are then combined with azimuth information, from where the combined information is processed by a plot processor to obtain plots of the validated target.

For a radar system scanning for objects within a full circular range of 360°, scan data may be obtained with reference to a so-called radar image, which is divided in a number of image lines. An image line represents a single azimuth orientation range and one or more beam lines in elevation. For a radar system scanning in two dimensions, 2D, there is only one beam line in elevation, which is the total elevation coverage of the radar system. For the 2D radar system, the geographical orientation represented by the beam line of an image line is identical to the geographical orientation given by the image line itself. For a radar system scanning in three dimensions, 3D, there are several beam lines in elevation for each image line in azimuth, which beam lines together give the total elevation coverage for the radar system. A single image line in a 3D radar system may for example hold 3, 6 or 9 different beam lines in elevation, which may be obtained by digital beamforming. Each beam line represents a number of range cells, corresponding to the detection range of the radar system.

For each beam line holding a specific number of range cells and covering a specific elevation range and azimuth range, a sequence of signals is transmitted within a timeframe of which the radar system covers the elevation range of the beam line and the azimuth range of the corresponding image line, and a sequence of return signal is obtained, which return signals may be transformed into a range-Doppler map. Data from the range-Doppler map may be combined with the elevation and azimuth angles of the corresponding beam and image lines, to obtain a full data set holding range, azimuth, elevation, amplitude and radial velocity information of a validated target. A plot for a target may be generated based on a number of neighboring range cells having matching position and radial velocity data, and the plot may hold range cells within the same beam line and within several neighboring beam lines.

Thus, a plot may be generated based on information from several consecutively arranged range cells covering a certain scanning range and a certain azimuth and elevation orientation.

US 2020/0326418 A1 describes a Doppler type radar system of the above described type, which radar system includes one or more antennas configured to transmit and receive radar wave signals for scanning for objects within a detection space covering at least a part of a full circular detection coverage range, and further includes processing circuitry configured to provide scan data based on transmitted and received radar signals, and to generate a pre-processed data array based on obtained scan data. The processing circuitry is configured to provide scan data representing range cells within image lines of radar images covering at least a part of a full circular coverage range, wherein an image line represents a single azimuth orientation and one or more beam lines with an orientation in elevation, each image line representing one or more beam lines each holding a number of range cells, and wherein a detected object is represented by a number of hit range cells in one or more beam lines in one or more image lines, which hit range cells hold intensity data corresponding to the energy of returned radar wave signal(s). The processing circuitry is further configured to selecting a hit range cell or a number of neighboring hit range cells within at least a first beam line within a first image line of a first radar image, and to generate two-dimensional range-Doppler matrices for a plurality of neighboring beam lines within one or more image lines within the first radar image, which neighboring beam lines include the first beam line, wherein a generated range-Doppler matrix holds matrix cells or bins having matrix positions given by a first dimension representing range cell columns and a second dimension representing radial velocity rows, whereby each matrix cell/bin holds an intensity value corresponding to the energy of returned radar wave signals detected for a certain range cell and a certain radial velocity range given by the position of the matrix cell/bin within the range-Doppler matrix. Data from the range-Doppler matrix may be combined with the elevation and azimuth angles of the corresponding beam and image lines, to obtain a full data set holding range, azimuth, elevation, amplitude and radial velocity information of a validated target. A plot for a target may be generated based on a number of neighboring range cells having matching position and radial velocity data, and the plot may hold range cells within the same beam line and within several neighboring beam lines.

In order to perform a successful classification of an object, it is important to optimize the processing of the obtained reflected data. By increasing the systems capability to distinguish signals, which are reflected from target objects, from signals, which represents noise and different kind of clutter, the classification range of the system can be increased.

Modern computer technology allows the use of artificial intelligence, such as convolutional neural networks, CNNs, which may be trained with a large amount of data with known classification, extracted from radar images, in order to process data of new incoming radar images to help in a successful classification.

Thus, in order to make an effective use of existing convolutional neural networks and the development within the area of convolutional neural networks, a new type of pre-processing of radar data is needed in order to optimize any feature-extraction being extracted by the convolutional neural network from the obtained data, which features may form the basis for a classification process.

SUMMARY

It is an object of the disclosed embodiments to provide a radar system, which system holds processing circuitry configured to generate a data array based on received radar data to thereby provide an optimized input of radar data for further processing, such as processing by a neural network or convolutional neural network.

According to a first aspect there is provided a Doppler type radar system comprising:
one or more antennas configured to transmit and receive radar wave signals for scanning for objects within a detection space covering at least a part of a full circular detection coverage range; and processing circuitry configured to provide scan data based on transmitted and received radar signals, and to generate a pre-processed data array based on obtained scan data; wherein the processing circuitry is configured to:
provide scan data representing range cells within image lines of radar images covering at least a part of a full circular coverage range, wherein an image line represents a single azimuth orientation and one or more beam lines with an orientation in elevation, each image line representing one or more beam lines each holding a number of range cells, and wherein a detected object is represented by a number of hit range cells in one or more beam lines in one or more image lines, which hit range cells hold intensity data corresponding to the energy of returned radar wave signal(s); wherein the processing circuitry is further configured to:

selecting a hit range cell or a number of neighboring hit range cells within at least a first beam line within a first image line of a first radar image;

generate two-dimensional range-Doppler matrices for a plurality of neighboring beam lines within one or more image lines within the first radar image, which neighboring beam lines include the first beam line, wherein a generated range-Doppler matrix holds matrix cells or bins having matrix positions given by a first dimension representing range cell columns and a second dimension representing radial velocity rows, whereby each matrix cell/bin holds an intensity value corresponding to the energy of returned radar wave signals detected for a certain range cell and a certain radial velocity range given by the position of the matrix cell/bin within the range-Doppler matrix;

generating a first cropped range-Doppler matrix based at least partly on a first plurality of neighboring matrix cells selected from a first un-cropped range-Doppler matrix, which selected first plurality of neighboring matrix cells includes matrix cells representing at least one selected hit range cell within the first beam line within the first image line, wherein the positions of the matrix cells within the first cropped range-Doppler matrix correspond to the positions of the selected first plurality of matrix cells within the first un-cropped range-Doppler matrix;

generating a second cropped range-Doppler matrix based at least partly on a second plurality of neighboring matrix cells selected from a second un-cropped range-Doppler matrix representing a second beam line being a neighbor to a beam line having an un-cropped range-Doppler matrix for which a plurality of neighboring matrix cells are selected to serve as at least part basis for first cropped range-Doppler matrix, wherein the positions of the matrix cells within the second cropped range-Doppler matrix correspond to the positions of the selected second plurality of matrix cells within the second un-cropped range-Doppler matrix, said positions of the second plurality of matrix cells corresponding to the positions of the selected matrix cells within the first cropped range-Doppler matrix;

generating a third cropped range-Doppler matrix based at least partly on a third plurality of neighboring matrix cells selected from a third un-cropped range-Doppler matrix representing a third beam line being a neighbor to a beam line having an un-cropped range-Doppler matrix for which a plurality of neighboring matrix cells are selected to serve as at least part basis for first cropped range-Doppler matrix, wherein the positions of the matrix cells within the third cropped range-Doppler matrix correspond to the positions of the selected third plurality of matrix cells within the third un-cropped range-Doppler matrix, said positions of the third plurality of matrix cells corresponding to the positions of the selected matrix cells within the first cropped range-Doppler matrix; and generating a three-dimensional data array based at least partly on the first, second and third cropped two-dimensional range-Doppler matrices, which three-dimensional data array thereby represents data of at least three layers of matrix cells.

It should be understood that it is preferred that any selected matrix cell can only form part basis of a single cropped range-Doppler matrix. Thus, in a possible embodiment of the first aspect, none of the selected matrix cells forming basis for the first cropped range-Doppler matrix can be used to serve as basis for the second and third range-Doppler matrices, none of the selected matrix cells forming basis for the second cropped range-Doppler matrix can be used to serve as basis for the first and third range-Doppler matrices, and none of the selected matrix cells forming basis for the third cropped range-Doppler matrix can be used to serve as basis of the first and second range-Doppler matrices.

In a possible implementation form of the first aspect, a range-Doppler matrix is being generated for each beam line represented by an image line.

In a possible implementation form of the first aspect, the second beam line is a neighbor to the first beam line.

In a possible implementation form of the first aspect, the third beam line is a neighbor to the first beam line.

An image line represents a single azimuth orientation range and one or more beam lines in elevation. For a radar system scanning in two dimensions, 2D, there is only one beam line in elevation, which is the total elevation coverage of the radar system. For the 2D radar system, the geographical orientation represented by the beam line of an image line is identical to the geographical orientation given by the image line itself. Thus, for a 2D radar system when selecting a second beam line being a neighbor to the first beam line, this second beam line is represented by a second image line being a neighbor to the first image line, and when selecting a third beam line being a neighbor to the first beam line, this third beam line is represented by a third image line being a neighbor to the first image line.

For a radar system scanning in three dimensions, 3D, there are several beam lines in elevation, which together gives the total elevation coverage for the radar system. A single image line in a 3D radar system may for example hold 3, 6 or 9 different beam lines in elevation, which may be obtained by digital beamforming.

It should be understood that for a generated range-Doppler matrix according to the present disclosure, the positions of the matrix cells may equally be described by having the first dimension representing range cell in rows and the second dimension representing radial velocity in columns.

In a possible implementation form of the first aspect, the intensity values of the matrix cells within the first cropped range-Doppler matrix are at least partly based on the intensity values of the corresponding matrix cells within the first plurality of matrix cells.

In a possible implementation form of the first aspect, the intensity values of the matrix cells within the second cropped range-Doppler matrix are at least partly based on the intensity values of the corresponding matrix cells within the second plurality of matrix cells.

In a possible implementation form of the first aspect, the intensity values of the matrix cells within the third cropped range-Doppler matrix are at least partly based on the intensity values of the corresponding matrix cells within said third plurality of matrix cells.

For the three-dimensional data array, the first dimension may represent position of a range cell within a beam line of an image line, the second dimension may represent radial velocity range within a range cell, and the third dimension may represent position of the beam line within the first radar image. However, a cropped matrix may be formed by reducing several matrices representing several beam lines within one or more image lines.

By grouping the three cropped two-dimensional range-Doppler matrices into a three-dimensional data array, for which the third dimension has the value of three, the three-dimensional data array has dimensions similar to a digital Red-Green-Blue, RGB, image. The position of a pixel in the RGB image corresponds to the range and velocity position of a matrix cell, while the three pixel values of red, green and blue correspond to the three intensity values of the matrix cells at this position within the first, second and third cropped range-Doppler matrix. Thus, when the third dimension has the value of three, the three-dimensional data array has a format making it suitable for being input to several standard neural networks for feature extraction and image classification.

In order to optimize the performance of a neural network, it is common to perform a scaling of the pixel values of an RGB image, which for the three-dimensional data array corresponds to a scaling of the matrix cell intensity values. Such scaling may include a normalization of intensity values to a range between zero and one, a centering of intensity values both globally across the three cropped matrix layers of the data array and locally per cropped matrix layer.

In a possible implementation form of the first aspect, the processing circuitry is configured to perform a scaling of the intensity values of the cells of three-dimensional data array.

In a possible implementation form of the first aspect, the processing circuitry is configured to perform a scaling of the intensity values of the cells of the three-dimensional data array into the range of zero to one. In a possible implementation form of the first aspect, the processing circuitry is configured to perform a standardization step following the step of scaling, whereby the intensity values are manipulated to closely follow a normal distribution, e.g. by subtraction and division of a mean and standard deviation, respectively.

In a possible implementation form of the first aspect, each hit range cell within a beam line of an image line holds data for energy of returned signal(s) and data for radial velocity or velocities based on Doppler frequency signals, said scan data thereby for each hit range cell holding information of at least range, azimuth orientation, energy of returned radar wave signals, and radial velocity or velocities of a detected object.

A beam line represented by an image line may represent a relatively high number of range cells which may cover a high detection range, and the range cells within a full beam line or image line may cover location data of several detected objects, including data not related to the detected object, which should be classified. It is therefore important to perform a selection or cropping of the generated scan data.

This selection or cropping may be performed by first selecting one or more hit range cells from the obtained scan data, which may be represented by data of a raw radar image, and then selecting a number of range cells including the hit range cells. The data of a two-dimensional range-Doppler matrix may be represented by matrix cells or bins positioned in columns and rows, where each column represents the range of a range cell in the first dimension, and each row represents a range of radial velocity in the second dimension. Thus, from an un-cropped range-Doppler matrix, each range cell has a column with matrix cells or bins representing possible radial velocity ranges, and for each range cell, which is selected for the generation of a cropped range-Doppler matrix, a number of column matrix cells or bins may now be selected for the generation of a cropped range-Doppler matrix.

Each range cell represents a scanning range, and it is preferred that the selected number of range cells, which is selected for the generation of a cropped range-Doppler matrix, represents a predetermined distance between a minimum and maximum range including the range represented by at least part of the selected hit range cells. It is also preferred that the predetermined scanning range extends on both sides of the range or distance represented by the hit range cell(s).

The predetermined scanning range may be determined based on the size of objects being detected, the expected distance between detected objects and the radar systems range resolution. If the predetermined scanning range is set too big, then range cells holding data not related to the detected object, which should be classified, may be included. For detection of birds and drones, the predetermined scanning range may be set in the range of 10 m to 100 m, such as in the range of 30 m to 80 m, such as in the range of 60 m to 70 m. The number of range cells to be selected to cover the predetermined scanning range depends to the design parameters of the radar system. The radar system may be designed to have a range cell representing a range of e.g. in the range or 2 m to 10 m.

In an embodiment the selected hit range cells comprise the hit range cell representing the highest intensity data value, and the cropping of range cells may then be performed by selecting an equal number of range cells on both sides of this hit range cell, to thereby represent the predetermined scanning range. In an embodiment the radar system has a range resolution of about 3.2 m/range cell, and by cropping 21 range cells with the center range cell being the high intensity hit range cells, and with 10 range cells on each side of this center range cell, a predetermined scanning range of about 67 m is obtained.

When selecting the matrix cells/bins for a cropped range-Doppler matrix, a number of range cells are selected, and for each range cell a number of corresponding velocity cells/bins are selected. In order to classify a detected object, it is important to crop the number of range-Doppler matrix cells/bins giving maximum information as input to the feature extraction and object classification. Here, the radial velocity data represents the most important data, and a detected object may be represented by both positive and negative radial velocities. It is therefore preferred to retain all or most of the available velocity cells/bins representing a selected range cell for the cropped range-Doppler matrix, while limiting the number of selected range cells.

In a possible implementation form of the first aspect, the step of selecting a hit range cell or a number of neighboring hit range cells within at least a first beam line within a first image line comprises selecting a range cell holding the highest intensity data value from a group of hit range cells representing an object to be classified.

It is preferred that the step of selecting a hit range cell or a number of neighboring hit range cells is performed by evaluating the intensity data of several range cells represented by several beam lines within one or more image lines. It is within another embodiment that the step of selecting a hit range cell or a number of neighboring hit range cells is performed after generation of the range-Doppler matrices, and comprises selecting the range cell column holding the highest summation of intensity values when summed for all velocity cells/bins from the group of range cells that represent the object that is to be classified.

In a possible implementation form of the first aspect, then for the generation of the first cropped range-Doppler matrix, the selection of the first plurality of matrix cells from the first un-cropped range-Doppler matrix cell comprises selecting a sequential number of range cell columns representing a predetermined scanning range and including one or more range cell columns representing one or more of the selected hit range cells within the first beam line.

In a possible implementation form of the first aspect, the predetermined scanning range extends on both sides of the range or distance represented by at least one of the one or more hit range cell(s).

In a possible implementation form of the first aspect, a single hit range cell is selected, which single hit range cell is represented by a center range cell column within said sequential number of range cell columns.

In a possible implementation form of the first aspect, the sequential number of range cell columns is selected to represent a predetermined scanning range in the range of 40 m to 100 m, such as in the range of 50 m to 80 m, such as in the range of 60 m to 70 m.

In a possible implementation form of the first aspect, then for the generation of the first cropped range-Doppler matrix, the selection of the first plurality of matrix cells from the first un-cropped range-Doppler matrix comprises selecting at least one half of the matrix cells/bins within each of the selected range cell columns.

In a possible implementation form of the first aspect, the selection of the first plurality of matrix cells from the first un-cropped range-Doppler matrix comprises selecting all of the matrix cells/bins within each of the selected range cell columns.

It is within an embodiment that the maximum velocity detection range of a system is limited to correspond to a maximum of 100 Doppler cells or bins in the un-cropped range-Doppler matrix. In this embodiment the location of a range cell represents a line or column holding 100 matrix cells, each of which define a velocity range.

It should be understood that for the generation of the second and third cropped range-Doppler matrices, the positions of the selected second and third plurality of matrix cells from the second and third un-cropped range-Doppler matrix, respectively, are equal to the positions of the selected first plurality of matrix cells from the first un-cropped range-Doppler matrix.

In a possible implementation form of the first aspect, the generation of the second cropped range-Doppler matrix is based at least partly on a second plurality of neighboring matrix cells selected from a second un-cropped range-Doppler matrix representing a second beam line being a neighbor to the first beam line, said second beam line being represented by a second image line or by the first image line.

In a possible implementation form of the first aspect, the generation of the third cropped range-Doppler matrix is based at least partly on a third plurality of neighboring matrix cells selected from a third un-cropped range-Doppler matrix representing a third beam line being a neighbor to the first beam line, said third beam line being represented by a third image line or by the first image line.

In a possible implementation form of the first aspect, the generation of the second cropped range-Doppler matrix is based at least partly on a second plurality of neighboring matrix cells selected from a second un-cropped range-Doppler matrix representing a second beam line being a neighbor to the first beam line, said second beam line being represented by a second image line being a first neighbor line to the first image line.

In a possible implementation form of the first aspect, the generation of the third cropped range-Doppler matrix is based at least partly on a third plurality of neighboring matrix cells selected from a third un-cropped range-Doppler matrix representing a third beam line being a neighbor to the first beam line, said third beam line being represented by a third image line being a second neighbor to the first image line.

In a possible implementation form of the first aspect, the generation of the second cropped range-Doppler matrix is further based at least partly on a fourth plurality of neighboring matrix cells selected from a fourth un-cropped range-Doppler matrix representing a fourth beam line being a neighbor to the first beam line, said fourth beam line being represented by a third image line being a second neighbor line to the first image line.

In a possible implementation form of the first aspect, the generation of the third cropped range-Doppler matrix is based at least partly on a third plurality of neighboring matrix cells selected from a third un-cropped range-Doppler matrix representing a third beam line being a neighbor to the first beam line, said third beam line being represented by the first image line.

In a possible implementation form of the first aspect, the generation of the third cropped range-Doppler matrix is further based at least partly on a fifth plurality of neighboring matrix cells selected from a fifth un-cropped range-Doppler matrix representing a fifth beam line being a neighbor to the first beam line, said fifth beam line being represented by the first image line.

In a possible implementation form of the first aspect, the radar system comprises a Doppler type radar, such as a Frequency Modulated Continuous Wave, FMCW, radar.

In a possible implementation form of the first aspect, the system further comprises processing circuitry holding a pre-trained neural network (NN), such as a convolutional neural network, CNN, for further processing of the data of the three-dimensional data array.

A convolutional neural network, CNN, may hold a convolution network performing a series of convolution and pooling operations for feature extraction followed by a collection of fully connected layers for classification of the detected object based on the extracted features.

In a possible implementation form of the first aspect, the detection coverage space is a full circular detection range, and the processing circuitry is configured to divide the received radar data into a sequential number of circular radar images with each circular radar image corresponding to a full circular radar scan.

The foregoing and other objects are achieved by the features of the independent claims. Further implementation forms are apparent from the dependent claims, the description and the figures. These and other aspects of the disclosed embodiments will be apparent from the embodiments described below.

BRIEF DESCRIPTION OF THE DRAWINGS

In the following detailed portion of the present disclosure, the disclosed embodiments will be explained in more detail with reference to the example embodiments shown in the drawings, in which:

FIGS. 2a and 2b illustrate a radar image with range cells within beam lines represented by image lines of a two-dimensional radar system according to an example embodiment;

FIG. 5a shows a first un-cropped range-Doppler matrix representing a first beam line holding hit-range cells according to an example embodiment;

FIG. 5b shows a first cropped range-Doppler matrix representing cropped matrix cells selected from the first un-cropped range-Doppler matrix of FIG. 5a according to an example embodiment;

FIG. 10 illustrate a selection of first, second and third beam lines holding radar data for forming a number of first, second and third un-cropped range-Doppler matrices, which un-cropped range-Doppler matrices form at least part of the basis for first, second and third cropped range-Doppler matrices according to a fourth example embodiment;

FIG. 11 illustrate a selection of first, second and third beam lines holding radar data for forming a number of first, second and third un-cropped range-Doppler matrices, which un-cropped range-Doppler matrices form at least part of the basis for first, second and third cropped range-Doppler matrices according to a fifth example embodiment;

DETAILED DESCRIPTION

Figure 1:
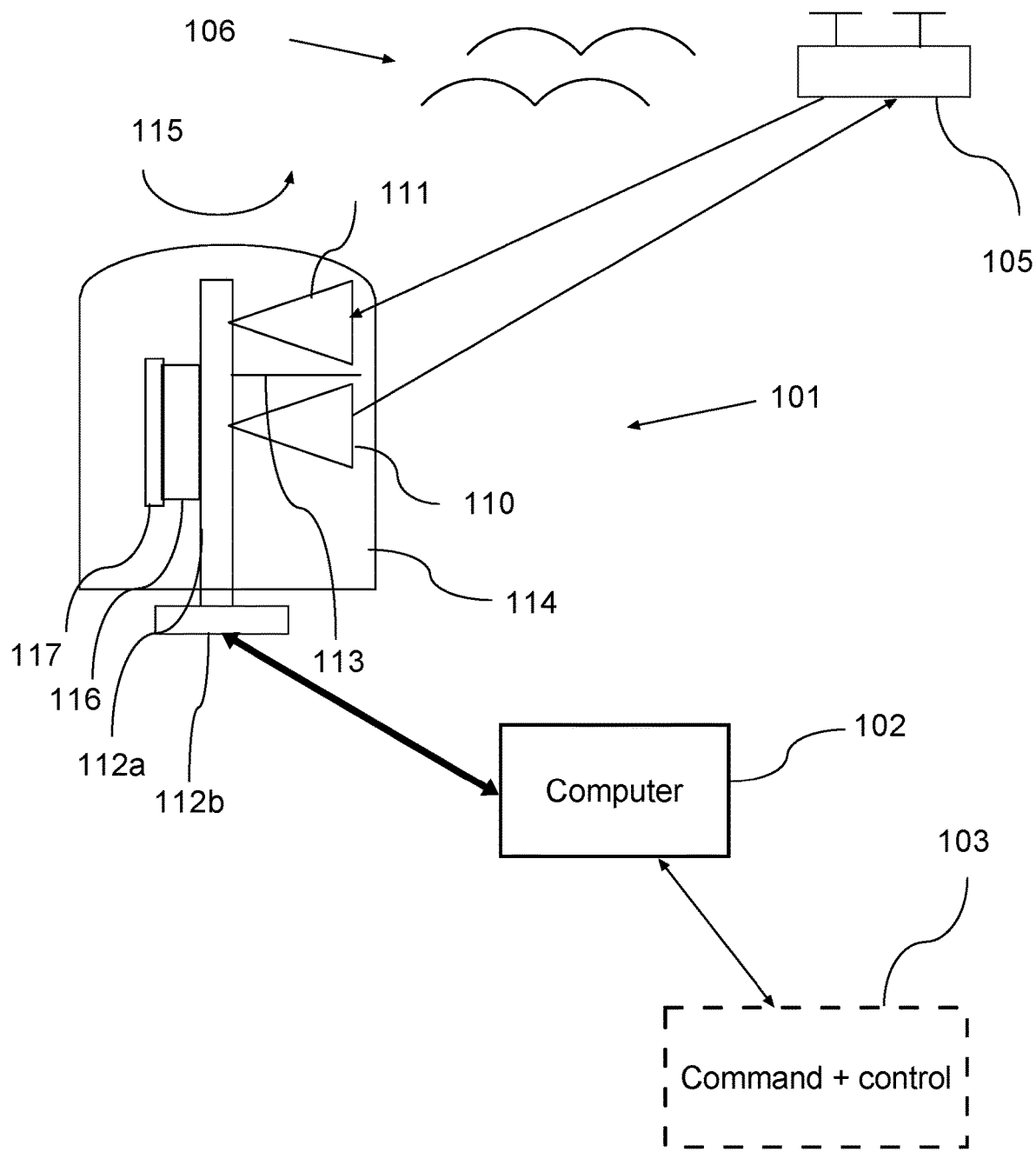
FIG. 1 is a schematic block diagram illustrating the basic structure of a scanning radar system according to an example embodiment.

FIG. 1 is a schematic block diagram illustrating the basic structure of a two-dimensional, 2D, scanning radar system according to an example embodiment. The system comprises a Frequency Modulated Continuous Wave, FMCW, radar system 101 electronically connected to a computer system 102. Generated output data may be communicated to an external command and control system 103, where the data may be communicated by live data streaming, where for example Extensible Markup Language, XML, may be used for streaming.

The FMCW radar system 101 holds a transmitting horn antenna 110 and a receiving horn antenna 111 with a splitting plane 113 arranged between the two antennas 110 and 111 in order to prevent false reflections. The antennas 110, 111 are enclosed by a radome 114 made of a plastic type, which gives no or very low reflections of the radar waves, to thereby avoid disturbance of the Doppler frequency shift. The splitting plane 113 is arranged very close to the radome 114, again to prevent false reflections. The antennas 110, 111 are mounted to an upright support 112a, which is rotatably mounted to a horizontal support 112b, where the horizontal support is configured for rotating 115 the upright 112a with the antennas 110, 111 at a rotational speed of 45 rounds per minute, rpm. An azimuth encoder is provided at the horizontal support 112b, which encoder is configured for encoding and communicating the degree of rotation, and thereby the azimuth angle, of the antennas 110, 111, at a very high precision. The antenna system 101 is configured for transmitting FMCW radar signals in the range of 8.7 to 10 GHz at a transmission power of about 4 Watt. The horn antennas 110 and 111 covers an almost square beam window having a beam height about 10° and a beam width of about 10°. Such a configuration of the antenna system 101 results in a detection coverage range of about 2.7 km, while the classification range is smaller and in the range of 1.1 km for the known technologies. The beam width of 10° is much wider than normal for FMCW radar systems, where a beam width around 1° is usual. By using a wide beam width of 10° the target or object being detected will be exposed to the transmitted radar signals for a longer time, resulting in more time for data processing in order to determine the Doppler frequency shift. The targets or objects being exposed to the radar signals may include one or more Unmanned Aerial Vehicles, UAVs, 105 and one or more birds 106. From FIG. 1 it is seen that the location of the birds 106 differs from the location of the UAV 105, with the birds 106 being located closer to the antennas 110, 111 than the UAV 105.

The FMCW radar system 101 holds electronic front-end circuitry 116, which is also mounted to the upright 112a, for feeding the transmitting antenna 110 and for receiving radar return signals being received by the receiving antenna 111. The front-end circuitry 116 is enclosed by an aluminium shield 117, which shields for electronic noise signals to enter the circuitry 116, and which also acts as a heat sink. The front-end circuitry 116 is electronically connected to back-end circuitry being part of the azimuth encoder for communicating the azimuth angle. The front-end circuitry 116 and the back end circuitry are electronically connected to the computer system 102, whereby electronic circuitry of the computer system 102, the front-end circuitry 116 and the back-end circuitry together provide processing circuitry for processing signals forwarded to and received from the antenna system 101 and for generating radar plots. The processing circuitry may also perform the processing for generating object tracks based on the plots and for classifying the objects of the tracks.

The electronic signals are transferred via a glass fibre cable from the front-end circuitry 116 to a rotary joint at the horizontal support 112*b*, which is connected to the computer system 102 by cables.

The scanning operating and presentation of data in range-Doppler maps is further illustrated in FIGS. 2, 3 and 4.

The FMCW radar system 101 may scan for objects within a full circular range of 360°, and scan data is obtained with reference to a radar image as illustrated in FIG. 2*a*. FIG. 2*a* shows and example embodiment of a 2D radar image 200, which is divided in 80 image lines, 201, to cover a full azimuth range, 204, of 360° for an image. The radar 101 rotates with 45 rounds per minute, rpm, where a full radar image 200 is obtained for each rotation. Each image line represents a single beam line having a beam height in elevation of about 10°, and is divided in 1536 range cells, 203, and covers an azimuth range of 4.5°, 202. The radar, 101, transmits 100 FMCW sweep signals, per image line, which are mixed with corresponding returned radar wave signals, and from a mixed set of radar signals, where each set represents a full 100 FMCW sweep signals, a Doppler map representing the corresponding image line/beam line, 201, having a certain azimuth range and elevation range, is generated. In FIG. 2*a*, range cell 205 shows a hit range cell having a higher intensity of returned radar wave energy, which corresponds to the location of a detected object.

The antennas 110, 111 of the radar system 101 has a beam width of about 10°, which is about twice the azimuth range for an image line 201. This allows the transmission and receipt of the 100 FMCW sweep signals within the time frame of which an image line 201 is covered by the antennas 110, 111 during the rotation of the radar system 101.

FIG. 2*a* illustrates the arrangement 200 of image lines/beam lines 201 of the 2D radar system 101 in a spherical coordinate system, while FIG. 2*b* illustrates the arrangement of image lines/beam lines of the 2D radar system 101 as a row of blocks 210 in a cartesian coordinate system. Each block 210 represents an image line/beam line, and each image line/beam line 210 is divided in a number of range cells, which for the radar system is 1536 range cells. Each of the image line/beam lines 201*a*, 201*b* and 201*c* holds one or more hit range cells, with the total intensity of returned radar wave energy being higher for line 201*a* than for lines 201*b* and 201*c*, which is indicated by XX for line 201*a* and x for lines 201*b* and 201*c*.

Figure 3A:
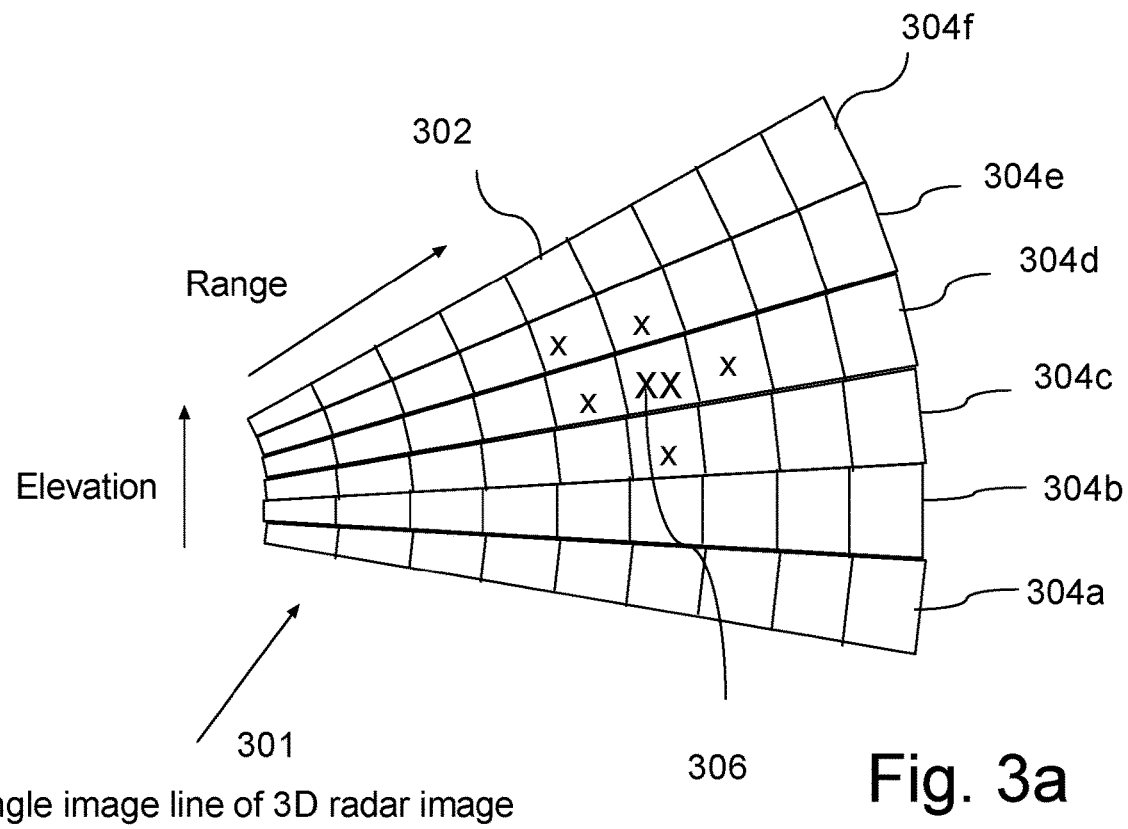
FIGS. 3a and 3b illustrate image lines with beam lines and range cells of a three-dimensional radar system according to an example embodiment.

FIG. 3*a* illustrates a single image line 301 covering a certain orientation in azimuth of a three-dimensional, 3D, radar system, in a spherical coordinate system, for which the image line 301 represents several beam lines 304*a*-304*f*, which in this case is 6 beam lines, with each beam line having a distinct beam orientation in elevation, and with each beam line representing or holding a number of range cells 302. Each of the beam lines 304*c*, 304*d* and 304*e* holds one or more hit range cells as indicated by x or XX, where beam line 304*d* holds three hit range cells, beam line 304*d* holds two hit range cells, and beam line 304*c* holds a single hit range cell. Beam line 304*d* holds the hit range cells 306 having the highest intensity of returned radar wave energy, which is indicated by XX, while the other hit range cells marked with x have a lower intensity of returned energy.

Figure 3B:
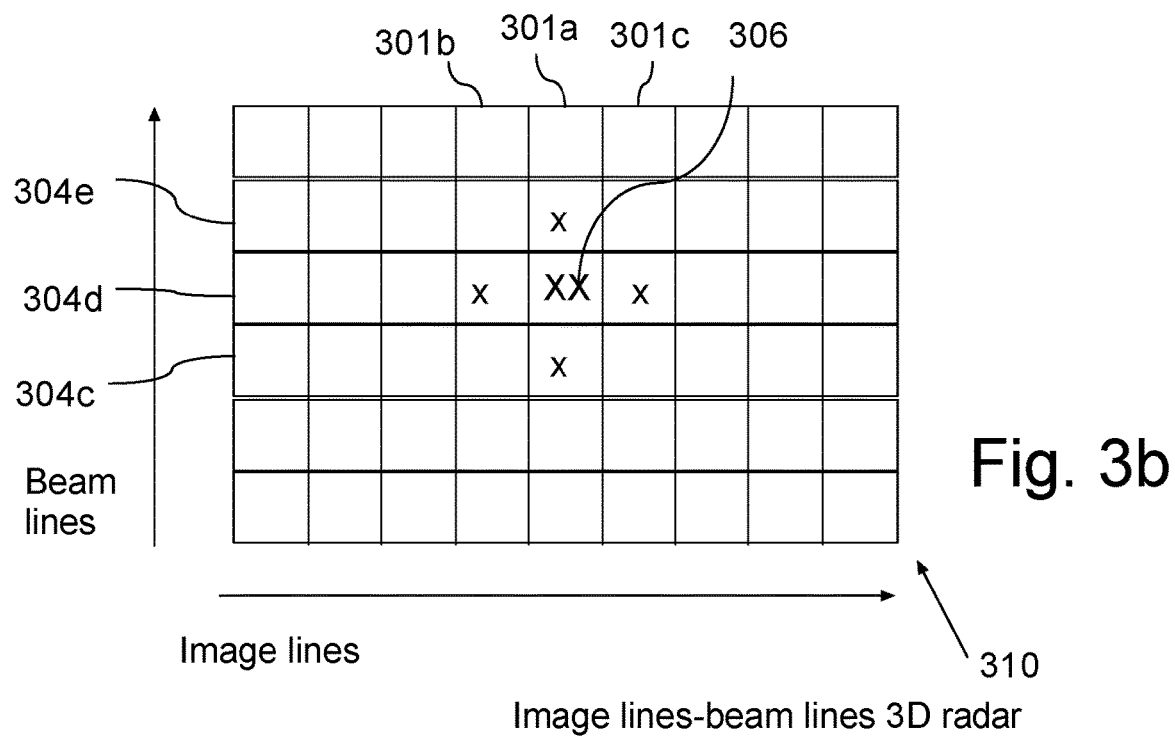

FIG. 3*b* illustrates the arrangement of image lines 301 and beam lines 304 of a 3D radar system as image line columns and beam line rows of blocks 310 in a cartesian coordinate system. Each block 310 represents a beam line, and each beam line is divided in a number of range cells, 302, see FIG. 3*a*. Each of the blocks or beam lines of column and row coordinates (301*b*, 304*d*), (301*a*, 304*c*), (301*a*, 304*d*), (301*a*, 304*e*), and (301*c*, 304*d*) holds a number of hit range cells as indicated by x or XX. Beam line with coordinates (301*a*, 304*d*) holds hit range cells 306 having the highest intensity of returned radar wave energy, which is indicated by XX, while the hit range cells of the other beam lines marked with x has a lower intensity of returned energy.

Figure 4A:
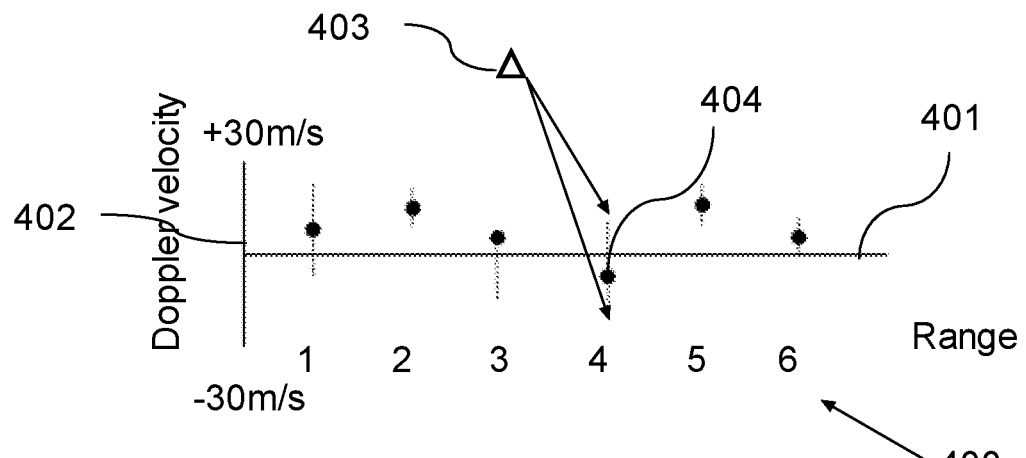
FIGS. 4a and 4b illustrates a range-Doppler map or matrix with micro-Doppler signatures according to an example embodiment.

FIGS. 4*a* illustrates a range-Doppler map 400 with micro-Doppler signatures according to an example embodiment, where range is along the x-axis, 401, and radial velocity/Doppler velocity is along the y-axis, 402, with maximum radial velocities of +30 m/s and −30 m/s. The range-Doppler map 400 of FIG. 4*a* shows an example of the spread in radial velocities for 6 range cells. For range cell 4 there is a spread in the observed radial velocity indicated by Δ, 403, where the full dot, 404, indicates the radial velocity, for which the received return signal has the highest amplitude or return energy, while the smaller dots on each side of the full dot, 404, represents radial velocities with smaller amplitude or return energy in the received return signal. For range cell 4, the main contribution in radial velocity indicated by the dot 404 may come from the torso of a target, such as a bird or helicopter, and represent the radial/Doppler velocity of the target, while the observed velocity-sidebands around the dot, 404, are referred to as micro-Doppler signatures and may represent flapping motion of bird wings or propeller blades of a helicopter.

Figure 4B:
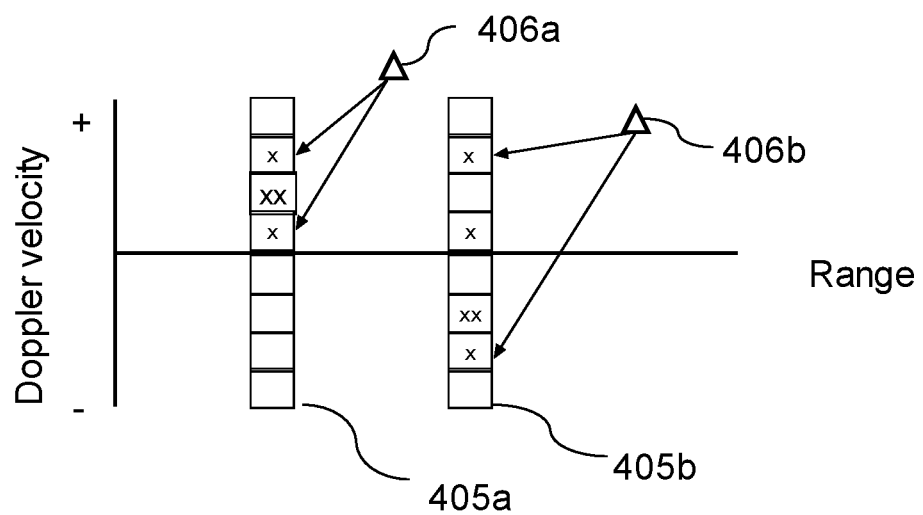

The range-Doppler map may be calculated as a range-Doppler matrix, where a column of the matrix represents the velocity detection span for a given individual target range or range cell, and a row represents the range detection span for a given individual target velocity range. The velocity column may be referred to as a so-called Doppler signature, and the range-Doppler map/matrix then consists of the Doppler signatures of all the individual target ranges or range cells. Each cell, which may be referred to as a bin, within the range-Doppler matrix then represents a certain range cell, and a certain radial velocity range. This is illustrated in FIG. 4*b*, which shows two Doppler signatures, 405*a* and 405*b*, for two different target ranges or range cells. The amount of received return energy is indicated by one or more "x" for each bin of the Doppler signatures, 405*a* and 405*b*. Both Doppler signatures, 405*a* and 405*b*, have velocity sidebands or micro-Doppler signatures on both sides of a main Doppler velocity, where the bins with "xx" may represent the torso of a target, while the bins with one "x" may represent flapping or rotating motions of a target.

The Doppler signature 405*a* holds three neighboring bins with observed radial velocities given a radial velocity spread Δ, 406*a*. It is noted that all the observed velocities within the spread 406*a* are positive, indicating that all target parts giving a return signal are moving away from the radar system 101 at the time of observation. The Doppler signature 405*b* holds four bins with observed radial velocities given a radial velocity spread Δ, 406*b*. It is noted that the observed velocities within the spread 406*b* are both positive and negative, with the highest return energy being observed for a bin with negative radial velocity, indicating that the torso of the target is moving in the direction of the radar system 101, while other parts of the target are moving in both radial directions of the radar system 101 at the time of observation. The Doppler signatures 405*a*, 405*b* of FIG. 4*b* each holds 8 bins, but for the 2D radar system 101, which is configured for 100 FMCW sweep signals, 205, per image line, 201, then the obtained Doppler signatures has 100 bins, with 50 bins for positive radial velocities and 50 bins for negative radial velocities. With 1536 range cells, 203, within each image line/beam line, 201, then for each image line/beam line, 201, a range-Doppler map/matrix holding 100 rows and 1536 columns is generated for each image line/beam line, 201. For 80 image lines, 201, then 80 range-Doppler maps/matrices have to be generated to cover a full radar image, 200, where each range-Doppler map/matrix corresponds to an image line within a defined 4.5° azimuth range. It is noted that each bin, for which there is a hit-target, holds information of the amplitude or return energy of the received radar signal, and the position of the bin within the range-Doppler map/matrix gives the radial velocity of the target and the distance to the target, while the azimuth angle is given by the position of the image line, 201, within the radar image, 200.

For a 3D radar system as illustrated in FIGS. 3a and 3b with 80 image lines within a full radar image and 6 beam lines within each image line, giving a total of 480 beam lines for a full radar image, then 480 range-Doppler maps/matrices have to be generated to cover a full 3D radar image.

An important feature of the present disclosure is to generate a number of cropped range-Doppler matrices holding information of a detected object, which information can be used for further processing, such as being input to a neural network. From the data of radar images provided by the radar system, one or more plots of detected objects can be observed, where each plot indicates the location of the detected object in the form of a number of neighboring hit range cells. One or more hit range cells may now be selected for further processing by evaluating the intensity data of several hit range cells, which may be represented within a single beam line or within several beam lines. In a preferred embodiment a single hit range cell is selected, which hit range cell holds the highest intensity data value within a number of hit range cells represented by the plot.

In order to generate a first cropped range-Doppler matrix, it is important to select a first un-cropped range-Doppler matrix, which represents a beam line holding at least one selected hit range cell representing the detected object.

This is illustrated in FIGS. 5a and 5b, for which FIG. 5a shows a first un-cropped range-Doppler matrix 500a representing a first beam line holding a selected hit-range cell 506, and FIG. 5b shows a first cropped range-Doppler matrix 500b representing cropped matrix cells selected from the first un-cropped range-Doppler matrix 500a of FIG. 5a according to an example embodiment.

The un-cropped range-Doppler matrix 500a holds a number of matrix cells or bins representing hit range cells for two detected objects having different Doppler signatures.

The amount of received return energy is indicated by one or more "x" for each bin of the Doppler signatures. The first object is detected within the range given by range cells 502 and 503 and has a Doppler signature with only positive radial velocities indicating that the object is moving in a direction away from the radar system. The second object is detected at a location given by range cells 505, 506 and 507, which is further away from the radar system than the location of the first object. The Doppler signature of the second object has a negative main Doppler velocity, indicating that the second object is moving in a direction towards the radar system, and holds both positive and negative velocity sidebands. When comparing the range-Doppler matrix 500a with the objects of FIG. 1, the first detected object located within the range of range cells 502 and 503 may be the birds 106 of FIG. 1 and the second detected object within the range of range cells 505, 506 and 507 may be the UAV 105 of FIG. 1.

The selected hit range cell 506 holds the highest intensity data value of the detected second object, and in order to generate the first cropped range-Doppler matrix 500b, a first plurality of neighboring matrix cells is selected from the un-cropped matrix 500a. Here, the selected first plurality of neighboring matrix cells includes matrix cells from the column represented by the selected hit range cell 506, and matrix cells selected from a sequential number of columns representing range cell neighboring the selected hit range cell 506 within the first beam line. It is preferred that matrix cells are selected from a number of range cell columns surrounding the column for hit range cell 506. This is illustrated in FIG. 5b, which shows the first cropped range-Doppler matrix 500b, for which all the matrix cells within the columns for range cell 506 and the two closest neighboring range cells 505 and 507 are selected. It is noted that no matrix cells from hit range cells 502 and 503 for the first object are selected and that range cell 507 contains a weak Doppler signature that helps classification by the neural network.

It should be understood that the number of range cells columns and Doppler velocity rows shown in FIGS. 5a and 5b are only for illustrative purposes. In an example embodiment, the un-cropped radar-Doppler matrix may hold 1536 columns representing 1536 range cells for each beam line, where each range cell may correspond to a range resolution of about 3.2 m, giving an instrumental coverage range of about 5 km, and 100 velocity rows of a velocity resolution of about 0.647 m/s representing a velocity range of about −32 m/s to +32 m/s.

It is noted that for a scanning radar system having an instrumental coverage range of 5 km, the detection range is smaller and depends on the size and shape of a detected object. For an UAV having a weight of 3 kg the detection range may be about 2.7 km, while the detection range is smaller for a smaller UAV. The classification range of the radar system is even smaller than the detection range, and based on presently known technologies, the classification range for the UAV of 3 kg may be around 1.1 km. However, using the principles of the present disclosure, and generating a three-dimensional data array as input for a neural network based classification system, it has been found that the classification range for the UAV of 3 kg can be increased from the former 1.1 km, and may be increased up to 2.5 km.

When selecting the matrix cells/bins for a cropped range-Doppler matrix, it is important to crop the number of range-Doppler matrix cells/bins giving maximum information as input to the feature extraction and object classification. Here, the radial velocity data represents the most important data, and it is preferred to retain all or most of the available velocity cells/bins representing a selected range cell for the cropped range-Doppler matrix, while limiting the number of selected range cells. For the first cropped range-Doppler matrix 500b all the matrix cells within the selected range cell columns are selected.

Each range cell represents a scanning range, and it is preferred that the selected number of range cells, which is selected for the generation of a cropped range-Doppler matrix, represents a predetermined distance between a minimum and maximum range including the range represented by at least part of the selected hit range cells. It is also preferred that the predetermined scanning range extends on both sides of the range or distance represented by the hit range cell(s).

The predetermined scanning range may be determined based on the size of objects being detected, the expected distance between detected objects and the radar systems range resolution. If the predetermined scanning range is set too big, then range cells holding data not related to the detected object, which should be classified, may be included. For classification of birds and drones, the predetermined scanning range may be set in the range of 10 m to 100 m, such as in the range of 30 m to 80 m, such as in the range of 60 m to 70 m. The number of range cells to be selected to cover the predetermined scanning range depends on the design parameters of the radar system. The radar system may be designed to have a range cell representing a range of e.g. in the range or 2 m to 10 m.

In an embodiment the selected hit range cells comprise the hit range cell representing the highest intensity data value, and the cropping of range cells may then be performed by selecting an equal number of range cells on both sides of this hit range cell, to thereby represent the predetermined scanning range. In an embodiment the radar system has a range resolution of about 3.2 m/range cell, and by cropping 21 range cells with the center range cell being the high intensity hit range cell, and with 10 range cells on each side of this center range cell, a predetermined scanning range of about 67 m is obtained. Thus, in an embodiment the first un-cropped range-Doppler matrix holds 1536 range cell columns and 100 velocity rows, while the corresponding first cropped range-Doppler matrix holds 21 range cell columns and 100 velocity rows.

When the first cropped range-Doppler matrix has been generated, the second and third cropped range-Doppler matrices need to be generated in order to finally obtain a three-dimensional data array based on the three generated two-dimensional cropped range-Doppler matrices. In order to generate the three-dimensional data array, then for the generation of the second and third cropped range-Doppler matrices, the positions of the selected second and third plurality of matrix cells from the second and third un-cropped range-Doppler matrix, respectively, shall be equal to the positions of the selected first plurality of matrix cells from the first un-cropped range-Doppler matrix. Thus, the first, second and third cropped range-Doppler matrices hold the same number of range cell columns and velocity rows.

Figure 6:
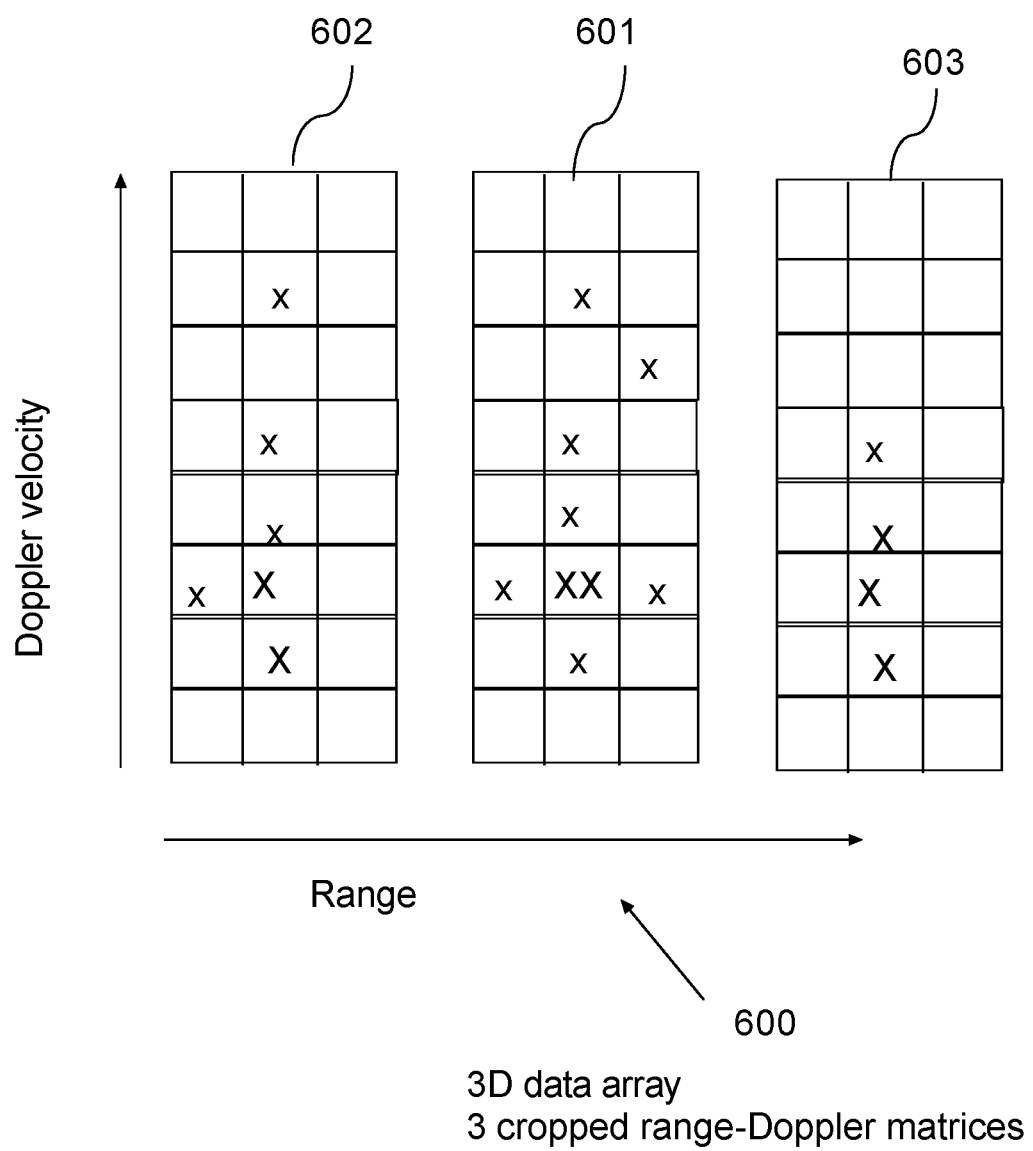
FIG. 6 shows three cropped range-Doppler matrices including the first cropped range-Doppler matrix of FIG. 5b, a second cropped range-Doppler matrix based at least partly on a second un-cropped range-Doppler matrix representing a second beam line and a third cropped range-Doppler matrix based at least partly on a third un-cropped range-Doppler matrix representing a third beam line according to an example embodiment.

This is illustrated in FIG. 6, which shows three cropped range-Doppler matrices 601, 602 and 603 of same dimensions forming the basis for a generated three-dimensional data array according to an example embodiment. The first cropped range-Doppler matrix 601 is equal to the cropped range-Doppler matrix 500*b* of FIG. 5*b* representing a first beam line, the matrix cells of the second cropped range-Doppler matrix 602 is cropped from a second un-cropped range-Doppler matrix representing a second beam line, and the matrix cells of the third cropped range-Doppler matrix 603 is cropped from a third un-cropped range-Doppler matrix representing a third beam line. It is preferred that the second beam line is a first neighbor to the first beam line and that the third beam line is a second neighbor to the first beam line.

Figure 7:
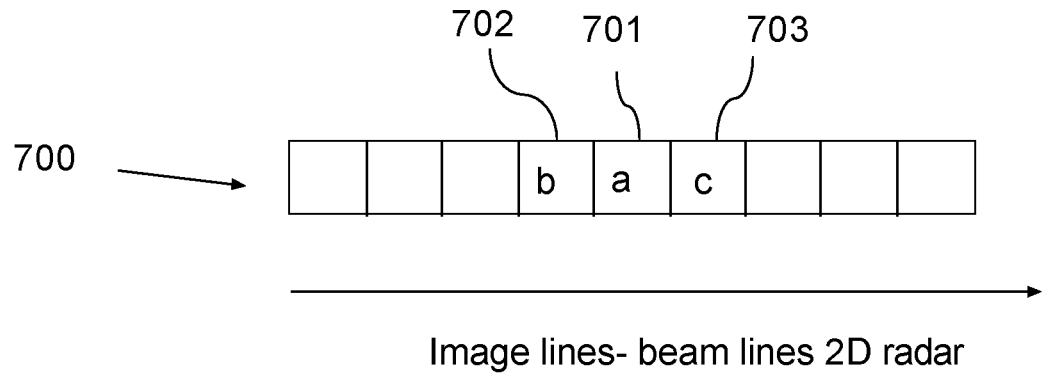
FIG. 7 illustrate a selection of first, second and third beam lines holding radar data for forming first, second and third un-cropped range-Doppler matrices, which un-cropped range-Doppler matrices form at least part of the basis for first, second and third cropped range-Doppler matrices according to a first example embodiment.

For a 2D radar system, the first, second and third neighboring beam lines are equal to corresponding first, second and third neighboring image lines. This is illustrated in FIG. 7, which shows a row of beam lines 700 of a 2D radar system, where each beam line corresponds to a single image line FIG. 7 illustrates a selection of first, second and third neighboring beam lines a, b, c each holding radar data for forming corresponding first, second and third un-cropped range-Doppler matrices, which un-cropped range-Doppler matrices form the basis for corresponding first, second and third cropped range-Doppler matrices 701, 702, 703 according to an example embodiment.

Figure 8:
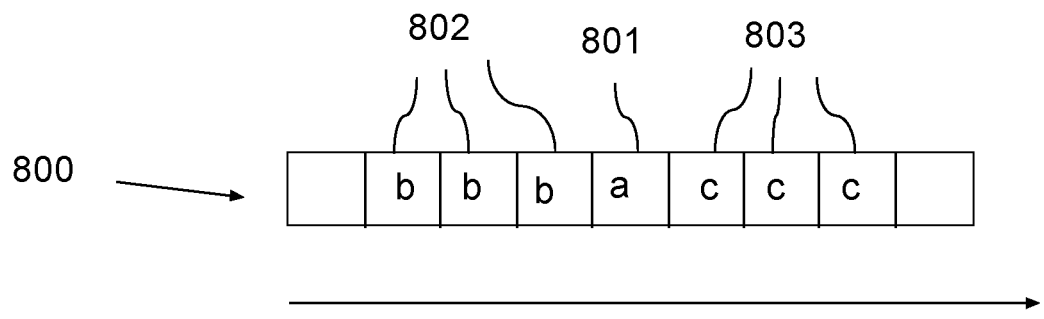
FIG. 8 illustrate a selection of first, second and third beam lines holding radar data for forming a number of first, second and third un-cropped range-Doppler matrices, which un-cropped range-Doppler matrices form at least part of the basis for first, second and third cropped range-Doppler matrices according to a second example embodiment.

For the embodiments described in connection with FIGS. 6 and 7, each cropped range-Doppler matrix is formed based on a corresponding single un-cropped range-Doppler matrix. However, it is within embodiments of the present disclosure, that a cropped range-Doppler matrix may be formed based on several un-cropped range-Doppler matrices representing several beam lines. When a cropped range-Doppler matrix is formed from a selection of matrix cells from several un-cropped range-Doppler matrices, then the positions of the selected matrix cells within one of these un-cropped range-Doppler matrices should be equal to the positions of selected matrix cells within any other of these un-cropped range-Doppler matrices. The intensity value of a matrix cell of the final cropped range-Doppler matrix may then be a function of the intensity values of the corresponding matrix cells of the selected several un-cropped range-Doppler matrices. As an example, the intensity value of a matrix cell of the final cropped range-Doppler matrix may be determined as the mean value of the intensity values of the corresponding matrix cells of the selected several un-cropped range-Doppler matrices FIG. 8 illustrates how un-cropped range-Doppler matrices from several beam lines may be selected for forming a single un-cropped range-Doppler matrix for a 2D radar system according to an example embodiment. FIG. 8 shows a row of image lines/beam lines 800 and illustrates the selection of a first single beam line a, having an corresponding un-cropped range-Doppler matrix giving the basis for a first cropped range-Doppler matrix 801, the selection of three neighboring beam lines, each labelled with b, having three corresponding un-cropped range-Doppler matrices used for forming a second cropped range-Doppler matrix 802, and the selection of three neighboring beam lines, each labelled with c, having three corresponding un-cropped range-Doppler matrices used for forming a third cropped range-Doppler matrix 803.

Figure 9:
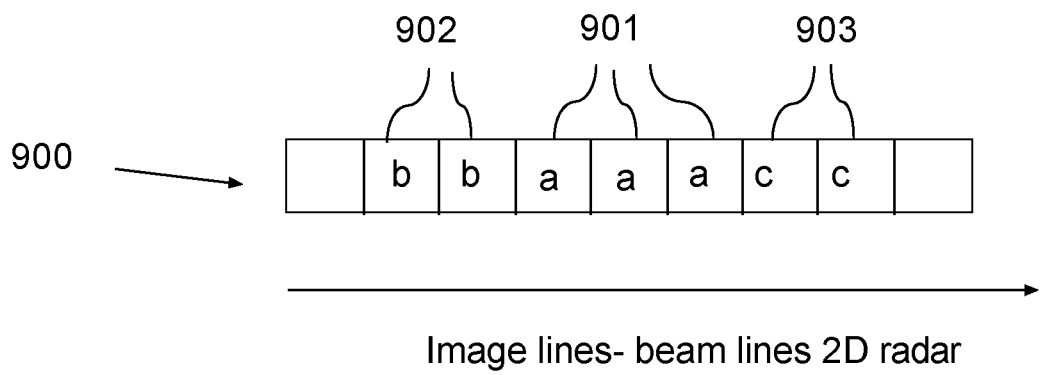
FIG. 9 illustrate a selection of first, second and third beam lines holding radar data for forming a number of first, second and third un-cropped range-Doppler matrices, which un-cropped range-Doppler matrices form at least part of the basis for first, second and third cropped range-Doppler matrices according to a third example embodiment.

FIG. 9 illustrates another example embodiment of how un-cropped range-Doppler matrices from several beam lines may be selected for forming a single un-cropped range-Doppler matrix for a 2D radar system. FIG. 9 shows a row of image lines/beam lines 900 and illustrates the selection of three neighboring beam lines, each labelled a, having three corresponding un-cropped range-Doppler matrices used for forming a first cropped range-Doppler matrix 901, the selection of two neighboring beam lines, each labelled with b, having two corresponding un-cropped range-Doppler matrices used for forming a second cropped range-Doppler matrix 902, and the selection of two neighboring beam lines, each labelled with c, having two corresponding un-cropped range-Doppler matrices used for forming a third cropped range-Doppler matrix 903.

For a 3D radar system, the first, second and third neighboring beam lines may be within a single image line, or the first and second beam lines may be within a single first image line with the third beam line being within a second image line being a neighbor to the first image line.

FIG. 10 shows a two-dimensional coordinate system 1000 with column of image lines and rows of beam lines of a 3D radar system, and illustrates a selection of first, second and third neighboring beam lines a, b, c each holding radar data for forming corresponding first, second and third un-cropped range-Doppler matrices, which un-cropped range-Doppler matrices form basis for corresponding first, second and third cropped range-Doppler matrices 1001, 1002, 1003 according to an example embodiment. Each of the three beam lines a, b, c is represented by the same image line 1005.

FIG. 11 shows another example embodiment of a two-dimensional coordinate system 1100 with column of image lines and rows of beam lines of a 3D radar system, and illustrates a selection of first, second and third neighboring beam lines a, b, c each holding radar data for forming corresponding first, second and third un-cropped range-Doppler matrices, which un-cropped range-Doppler matrices form basis for corresponding first, second and third cropped range-Doppler matrices 1101, 1102, 1103. Here, the three beam lines a, b, c have the same beam line row position 1004 and are represented by the three different but neighboring image lines.

Figure 12:
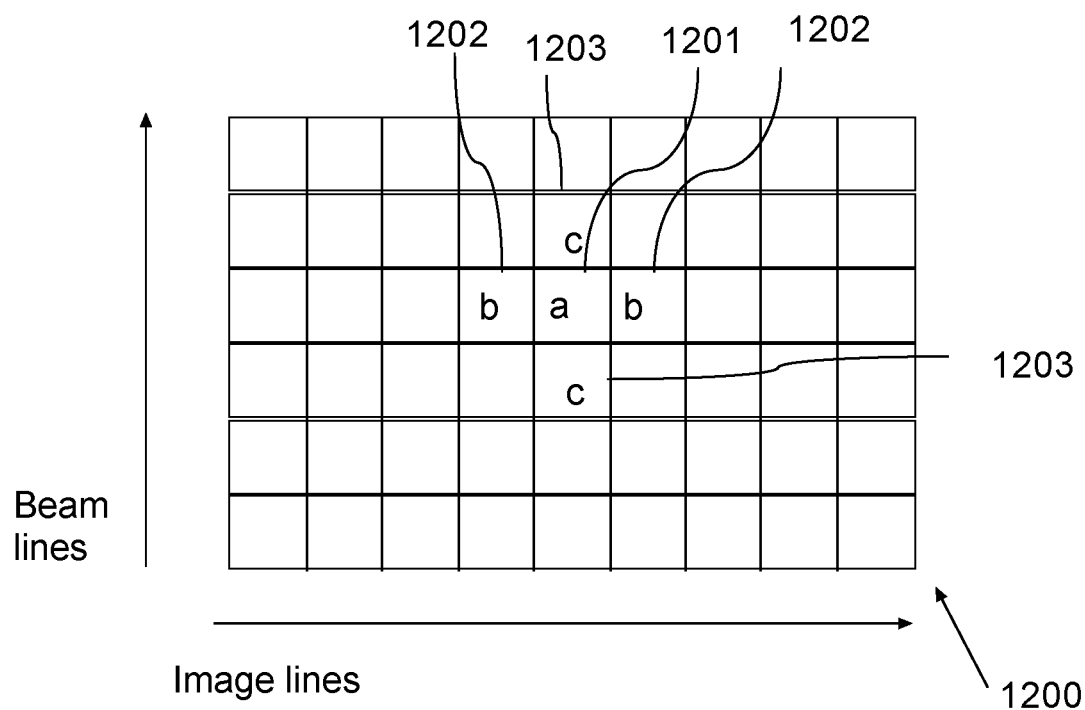
FIG. 12 illustrate a selection of first, second and third beam lines holding radar data for forming a number of first, second and third un-cropped range-Doppler matrices, which un-cropped range-Doppler matrices form at least part of the basis for first, second and third cropped range-Doppler matrices according to a sixth example embodiment.

FIG. 12 shows yet another example embodiment of a two-dimensional coordinate system 1200 with column of image lines and rows of beam lines of a 3D radar system, and illustrates the selection of a first single beam line a, having an corresponding un-cropped range-Doppler matrix giving the basis for a first cropped range-Doppler matrix 1201, the selection of two beam lines, each labelled with b and being neighbors to the first beam line a, which two beam lines b have two corresponding un-cropped range-Doppler matrices used for forming a second cropped range-Doppler matrix 1202, and the selection of two beam lines, each labelled with c and being neighbors to the first beam line a, which two beam lines c have two corresponding un-cropped range-Doppler matrices used for forming a third cropped range-Doppler matrix 1203. Here, the three beam lines a, b, b have the same beam line row position and are represented by the three different but neighboring image lines, while the three beam lines a, c, c are represented by the same image line.

Figure 13:
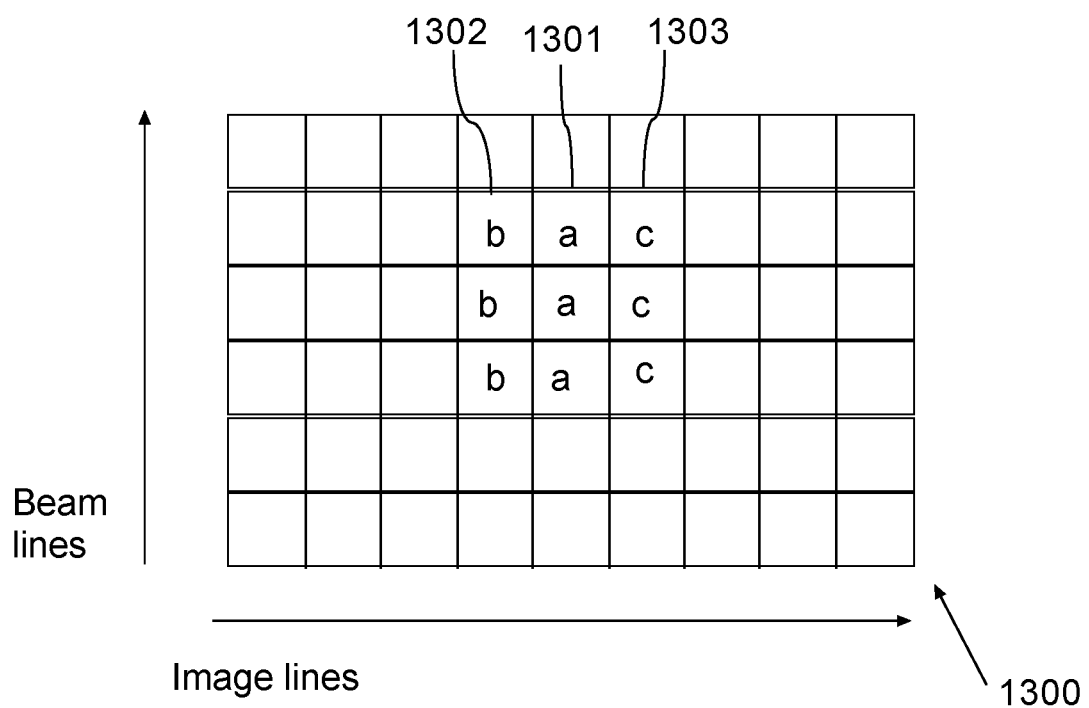
FIG. 13 illustrate a selection of first, second and third beam lines holding radar data for forming a number of first, second and third un-cropped range-Doppler matrices, which un-cropped range-Doppler matrices form at least part of the basis for first, second and third cropped range-Doppler matrices according to a fifth example embodiment.

FIG. 13 shows one more example embodiment of a two-dimensional coordinate system 1300 with column of image lines and rows of beam lines of a 3D radar system, and illustrates the selection of three neighboring beam lines, each labelled a, which three beam lines a, a, a have three corresponding un-cropped range-Doppler matrices giving the basis for a first cropped range-Doppler matrix 1301, the selection of three neighboring beam lines, each labelled with b, which three beam lines b, b, b have three corresponding un-cropped range-Doppler matrices used for forming a second cropped range-Doppler matrix 1302, and the selection of three neighboring beam lines, each labelled with c, which three beam lines c, c, c have three corresponding un-cropped range-Doppler matrices used for forming a third cropped range-Doppler matrix 1303. Here, the three beam lines selected for the first cropped matrix 1301 are represented by a single image line, the three beam lines selected for the second cropped matrix 1302 are represented by a single image line, and the three beam lines selected for the third cropped matrix 1303 are also represented by a single image line. The three images lines representing the selected beam lines are neighboring image lines, and the selected beam lines are within three neighboring beam line rows.

When generating the three-dimensional data array, there may be no restrictions as to which layer in the data array shall be represented by which cropped range-Doppler matrix. In an embodiment, the first cropped matrix may form the second and middle layer, with the second cropped matrix forming the first layer and the third cropped matrix forming the third layer.

Figure 14:
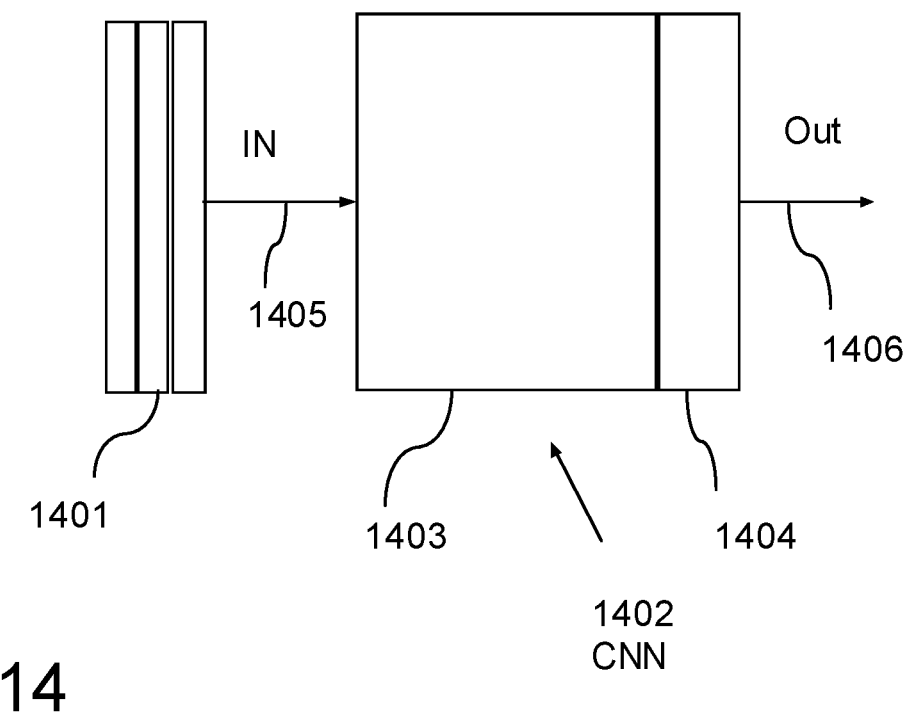
FIG. 14 is a block diagram illustrating a three-dimensional data array based on three cropped range-Doppler matrices, with data from the three-dimensional data array being input to a convolutional neural network for further processing.

FIG. 14 is a block diagram illustrating a three-dimensional data array 1401 based on three cropped range-Doppler matrices, with data from the three-dimensional data array 1401 being input 1405 to a convolutional neural network, CNN, 1402 for further processing according to an example embodiment. The convolutional neural network, CNN, 1402 may hold a convolution network 1403 performing a series of convolution and pooling operations for feature extraction followed by a collection of fully connected layers 1404 for classification of the detected object based on the extracted features. A classification output 1406 may hold a number of outputs n, where n is the number of classes, and each of the n outputs may correspond to a score for the class represented by the output. In an embodiment the number of classes may be set to two, one for an UAV or drone and one for non-UAV.

In order to optimize the performance of a neural network 1402, it is common to perform a scaling of the pixel values of an RGB image, which for the three-dimensional data array 1401 corresponds to a scaling of the matrix cell intensity values. Such scaling may in one embodiment include a normalization of intensity values to a range between zero and one, but in other embodiments the scaling may include a centering of intensity values globally across the three cropped matrix layers of the data array or locally per cropped matrix layer. The step of scaling may be followed by a step of standardization, whereby the intensity values are manipulated to closely follow a normal distribution, e.g. by subtraction and division of a mean and standard deviation, respectively.

The disclosed embodiments has been described in conjunction with various embodiments herein. However, other variations to the disclosed embodiments can be understood and effected by those skilled in the art in practicing the claimed disclosed embodiments, from a study of the drawings, the disclosure, and the appended claims. In the claims, the word "comprising" does not exclude other elements or steps, and the indefinite article "a" or "an" does not exclude a plurality.

The invention claimed is:

1. A Doppler radar system comprising:
one or more antennas configured to transmit and receive radar wave signals for scanning for objects within a detection space covering at least a part of a full circular detection coverage range; and processing circuitry configured to provide scan data based on transmitted and received radar signals, and to generate a pre-processed data array based on obtained scan data; wherein the processing circuitry -is configured to:
provide scan data representing range cells within image lines of radar images covering at least a part of a full circular coverage range, wherein an image line represents a single azimuth orientation and one or more beam lines with an orientation in elevation, each image line representing one or more beam lines each holding a number of range cells, and wherein a detected object is represented by a number of hit range cells in one or more beam lines within one or more image lines, which hit range cells hold intensity data corresponding to the energy of returned radar wave signal(s); wherein the processing circuitry is further configured to:
select a hit range cell or a number of neighboring hit range cells within at least a first beam line within a first image line of a first radar image; and
generate two-dimensional range-Doppler matrices for a plurality of neighboring beam lines within one or more image lines within the first radar image, which neighboring beam lines include the first beam line, wherein a generated range-Doppler matrix holds matrix cells or bins having matrix positions given by a first dimension representing range cell columns and a second dimension representing radial velocity rows, whereby each matrix cell/bin holds an intensity value corresponding to the energy of returned radar wave signals detected for a certain range cell and a certain radial velocity range given by the position of the matrix cell/bin within the range-Doppler matrix;

generate a first cropped range-Doppler matrix based at least partly on a first plurality of neighboring matrix cells selected from a first un-cropped range-Doppler matrix, which selected first plurality of neighboring matrix cells includes matrix cells representing at least one selected hit range cell within the first beam line within the first image line, wherein the positions of the matrix cells within the first cropped range-Doppler matrix correspond to the positions of the selected first plurality of matrix cells within the first un-cropped range-Doppler matrix;

generate a second cropped range-Doppler matrix based at least partly on a second plurality of neighboring matrix cells selected from a second un-cropped range-Doppler matrix representing a second beam line being a neighbor to a beam line having an un-cropped range-Doppler matrix for which a plurality of neighboring matrix cells are selected to serve as at least part basis for the first cropped range-Doppler matrix, wherein the positions of the matrix cells within the second cropped range-Doppler matrix correspond to the positions of the selected second plurality of matrix cells within the second un-cropped range-Doppler matrix, said positions of the second plurality of matrix cells corresponding to the positions of the selected matrix cells within the first cropped range-Doppler matrix;

generate a third cropped range-Doppler matrix based at least partly on a third plurality of neighboring matrix cells selected from a third un-cropped range-Doppler matrix representing a third beam line being a neighbor to a beam line having an un-cropped range-Doppler matrix for which a plurality of neighboring matrix cells are selected to serve as at least part basis for the first cropped range-Doppler matrix, wherein the positions of the matrix cells within the third cropped range-Doppler matrix correspond to the positions of the selected third plurality of matrix cells within the third un-cropped range-Doppler matrix, said positions of the third plurality of matrix cells corresponding to the positions of the selected matrix cells within the first cropped range-Doppler matrix; and generate a three-dimensional data array based at least partly on the first, second and third cropped two-dimensional range-Doppler matrices, which three-dimensional data array thereby represents data of at least three layers of matrix cells.

2. The system according to claim 1, wherein the second beam line is a neighbor to the first beam line.

3. The system according to claim 1, wherein the third beam line is a neighbor to the first beam line.

4. The system according to claim 1, wherein
the intensity values of the matrix cells within the first cropped range-Doppler matrix are at least partly based on the intensity values of the corresponding matrix cells within the first plurality of matrix cells;
the intensity values of the matrix cells within the second cropped range-Doppler matrix are at least partly based on the intensity values of the corresponding matrix cells within the second plurality of matrix cells; and
the intensity values of the matrix cells within the third cropped range-Doppler matrix are at least partly based on the intensity values of the corresponding matrix cells within said third plurality of matrix cells.

5. The system according to claim 1, wherein the processing circuitry is configured to perform a scaling of the intensity values of the cells of three-dimensional data array.

6. The system according to claim 5, wherein the processing circuitry is configured to perform a scaling of the intensity values of the cells of the three-dimensional data array into the range of zero to one.

7. The system according to claim 1, wherein each hit range cell within a beam line of an image line holds data for energy of returned signal(s) and data for radial velocity or velocities based on Doppler frequency signals, said scan data thereby for each hit range cell holding information of at least range, azimuth orientation, energy of returned radar wave signals, and radial velocity or velocities of a detected object.

8. The system according to claim 1, wherein the step of selecting a hit range cell or a number of neighboring hit range cells within at least a first beam line within a first image line comprises selecting a range cell holding the highest intensity data value from a group of hit range cells representing an object to be classified.

9. The system according to claim 1, wherein for the generation of the first cropped range-Doppler matrix, the selection of the first plurality of matrix cells from the first un-cropped range-Doppler matrix cell comprises selecting a sequential number of range cell columns representing a predetermined scanning range and including one or more range cell columns representing one or more of the selected hit range cells within the first beam line.

10. The system according to claim 9, wherein the predetermined scanning range extend on both sides of the range or distance represented by at least one of the one or more the hit range cell(s).

11. The system according to claim 9, wherein a single hit range cell is selected, which single hit range cell is represented by a center range cell column within said sequential number of range cell columns.

12. The system according to claim 9, wherein the sequential number of range cell columns is selected to represent a predetermined scanning range in the range of 40 m to 100 m.

13. The system according to claim 9, wherein for the generation of the first cropped range-Doppler matrix, the selection of the first plurality of matrix cells from the first un-cropped range-Doppler matrix comprises selecting at least one half of the matrix cells/bins within each of the selected range cell columns.

14. The system according to claim 13, wherein the selection of the first plurality of matrix cells from the first un-cropped range-Doppler matrix comprises selecting all of the matrix cells/bins within each of the selected range cell columns.

15. The system according to claim 1, wherein the generation of the second cropped range-Doppler matrix is based at least partly on a second plurality of neighboring matrix cells selected from a second un-cropped range-Doppler matrix representing a second beam line being a neighbor to the first beam line, said second beam line being represented by a second image line or by the first image line.

16. The system according to claim 1, wherein the generation of the third cropped range-Doppler matrix is based at least partly on a third plurality of neighboring matrix cells selected from a third un-cropped range-Doppler matrix representing a third beam line being a neighbor to the first beam line, said third beam line being represented by a third image line or by the first image line.

17. The system according to claim 1, wherein the generation of the second cropped range-Doppler matrix is based at least partly on a second plurality of neighboring matrix cells selected from a second un-cropped range-Doppler matrix representing a second beam line being a neighbor to the first beam line, said second beam line being represented by a second image line being a first neighbor line to the first image line.

18. The system according to claim 17, wherein the generation of the third cropped range-Doppler matrix is based at least partly on a third plurality of neighboring matrix cells selected from a third un-cropped range-Doppler matrix representing a third beam line being a neighbor to the first beam line, said third beam line being represented by a third image line being a second neighbor to the first image line.

19. The system according to claim 17, wherein the generation of the second cropped range-Doppler matrix is further based at least partly on a fourth plurality of neighboring matrix cells selected from a fourth un-cropped range-Doppler matrix being a two-dimensional range-Doppler matrix and representing a fourth beam line being a neighbor to the first beam line, said fourth beam line being represented by a third image line being a second neighbor line to the first image line.

20. The system according to claim 1, wherein the generation of the third cropped range-Doppler matrix is based at least partly on a third plurality of neighboring matrix cells selected from a third un-cropped range-Doppler matrix representing a third beam line being a neighbor to the first beam line, said third beam line being represented by the first image line.

21. The system according to claim 20, wherein the generation of the third cropped range-Doppler matrix is further based at least partly on a fifth plurality of neighboring matrix cells selected from a fifth un-cropped range-Doppler matrix being a two-dimensional range-Doppler matrix and representing a fifth beam line being a neighbor to the first beam line, said fifth beam line being represented by the first image line.

22. The system according to claim 1, wherein the radar system comprises a Frequency Modulated Continuous Wave (FMCW) radar.

23. The system according to claim 1, wherein the system further comprises processing circuitry holding a pre-trained neural network (NN) for further processing of the data of the three-dimensional data array-.

24. The system according to claim 1, wherein the detection coverage space is a full circular detection range, and wherein the processing circuitry is configured to divide the received radar data into a sequential number of circular radar images with each circular radar image corresponding to a full circular radar scan.

\* \* \* \* \*